(12) United States Patent
Call et al.

(10) Patent No.: US 10,514,669 B1
(45) Date of Patent: Dec. 24, 2019

(54) SYSTEMS AND METHODS FOR MANAGING THE OPERATION OF DEVICES WITHIN A PROPERTY

(71) Applicant: STATE FARM MUTUAL AUTOMOBILE INSURANCE COMPANY, Bloomington, IL (US)

(72) Inventors: Shawn M. Call, Bloomington, IL (US); Daryoush Hakimi-Boushehri, Bloomington, IL (US); John H. Weekes, Bloomington, IL (US); Ronny S. Bryant, Bloomington, IL (US); Jennifer Criswell, Bloomington, IL (US); Todd Binion, Bloomington, IL (US); Jackie O. Jordan, II, Bloomington, IL (US); Elisabeth McDermeit, Bloomington, IL (US); John Donovan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 274 days.

(21) Appl. No.: 14/692,961

(22) Filed: Apr. 22, 2015

Related U.S. Application Data

(60) Provisional application No. 62/073,695, filed on Oct. 31, 2014, provisional application No. 62/061,003,
(Continued)

(51) Int. Cl.
*G05B 15/02* (2006.01)
*H04L 12/28* (2006.01)

(52) U.S. Cl.
CPC .......... *G05B 15/02* (2013.01); *H04L 12/2803* (2013.01); *G05B 2219/163* (2013.01); *G05B 2219/2642* (2013.01)

(58) Field of Classification Search
CPC ............................ G05B 15/02; H04L 12/2803
(Continued)

(56) References Cited

U.S. PATENT DOCUMENTS 3,817,161 A 6/1974 Koplon
4,418,712 A * 12/1983 Braley .................. D06F 39/081
134/113
(Continued)

FOREIGN PATENT DOCUMENTS

CN 202865924 U 4/2013
WO WO-2013/076721 A1 5/2013

OTHER PUBLICATIONS

Knutsen, Confusion about causation in insurance: solutions for catastrophic losses, Ala. L. Rev., 5:957-1023 (2010).
(Continued)

*Primary Examiner* — Brian W Wathen
*Assistant Examiner* — Michael W Choi
(74) *Attorney, Agent, or Firm* — Marshall, Gerstein & Borun LLP

(57) ABSTRACT

Methods and systems for managing the operation of devices within a property, and processing insurance policies associated therewith. A property is populated with a plurality of smart devices, smart appliances, and/or other devices that are connected to, and/or in wired or wireless communication with a central controller, such as a smart home controller or insurance provider remote processor, whereby the plurality of devices and/or property are covered by an insurance policy. The central controller may collect sensor data from the plurality of devices and/or determine whether the property is occupied or not. The central controller may also identify a desired operating state of a device, generate a command according to the desired operating state, and/or transmit the command the device to facilitate prevention or reduction of risk or damage to the property. The central controller may also generate and/or process insurance claims associated with damage to the devices and/or property.

13 Claims, 11 Drawing Sheets

Related U.S. Application Data filed on Oct. 7, 2014, provisional application No. 62/061,018, filed on Oct. 7, 2014, provisional application No. 62/061,007, filed on Oct. 7, 2014, provisional application No. 62/061,009, filed on Oct. 7, 2014, provisional application No. 62/061,012, filed on Oct. 7, 2014, provisional application No. 62/061,016, filed on Oct. 7, 2014, provisional application No. 62/060,777, filed on Oct. 7, 2014, provisional application No. 62/060,808, filed on Oct. 7, 2014, provisional application No. 62/060,847, filed on Oct. 7, 2014, provisional application No. 62/061,000, filed on Oct. 7, 2014, provisional application No. 62/012,008, filed on Jun. 13, 2014, provisional application No. 61/984,541, filed on Apr. 25, 2014.

(58) Field of Classification Search
USPC .................................................. 700/275
See application file for complete search history.

(56) References Cited

U.S. PATENT DOCUMENTS

| | | | |
|---|---|---|---|
| 5,099,751 A | 3/1992 | Newman et al. | |
| 5,128,859 A | 7/1992 | Carbone et al. | |
| 5,267,587 A * | 12/1993 | Brown | E03B 7/071 137/624.12 |
| 5,554,433 A | 9/1996 | Perrone, Jr. et al. | |
| 6,023,762 A | 2/2000 | Dean et al. | |
| 6,155,324 A | 12/2000 | Elliott et al. | |
| 6,222,455 B1 | 4/2001 | Kaiser | |
| 6,526,807 B1 | 3/2003 | Doumit et al. | |
| 6,812,848 B2 | 11/2004 | Candela | |
| 7,030,767 B2 | 4/2006 | Candela | |
| 7,194,416 B1 | 3/2007 | Provost et al. | |
| 7,598,856 B1 | 10/2009 | Nick et al. | |
| 7,715,036 B2 | 5/2010 | Silverbrook et al. | |
| 7,809,587 B2 | 10/2010 | Dorai et al. | |
| 7,813,822 B1 | 10/2010 | Hoffberg | |
| 8,031,079 B2 | 10/2011 | Kates | |
| 8,041,636 B1 | 10/2011 | Hunter et al. | |
| 8,106,769 B1 | 1/2012 | Maroney et al. | |
| 8,229,861 B1 | 7/2012 | Trandal et al. | |
| 8,280,633 B1 | 10/2012 | Eldering et al. | |
| 8,289,160 B1 | 10/2012 | Billman | |
| 8,316,237 B1 | 11/2012 | Felsher et al. | |
| 8,400,299 B1 * | 3/2013 | Maroney | G06Q 10/10 340/540 |
| 8,527,306 B1 | 9/2013 | Reeser et al. | |
| 8,533,144 B1 | 9/2013 | Reeser et al. | |
| 8,595,034 B2 | 11/2013 | Bauer et al. | |
| 8,596,293 B2 | 12/2013 | Mous et al. | |
| 8,605,209 B2 | 12/2013 | Becker | |
| 8,620,841 B1 | 12/2013 | Filson et al. | |
| 8,621,097 B2 | 12/2013 | Venkatakrishnan et al. | |
| 8,650,048 B1 | 2/2014 | Hopkins, III et al. | |
| 8,694,501 B1 | 4/2014 | Trandal et al. | |
| 8,712,893 B1 | 4/2014 | Brandmaier et al. | |
| 8,730,039 B1 | 5/2014 | Billman | |
| 8,731,975 B2 | 5/2014 | English et al. | |
| 8,749,381 B1 | 6/2014 | Maroney et al. | |
| 9,049,168 B2 | 6/2015 | Jacob et al. | |
| 9,280,252 B1 * | 3/2016 | Brandmaier | G06Q 40/08 |
| 9,424,606 B2 | 8/2016 | Wilson, II et al. | |
| 9,429,925 B2 | 8/2016 | Wait | |
| 9,652,976 B2 | 5/2017 | Bruck et al. | |
| 9,654,434 B2 | 5/2017 | Sone et al. | |
| 9,947,051 B1 * | 4/2018 | Allen | G06Q 40/08 |
| 2002/0040306 A1 | 4/2002 | Sugiyama et al. | |
| 2003/0192600 A1 * | 10/2003 | Ford | E03B 7/071 137/624.12 |
| 2004/0054789 A1 | 3/2004 | Breh et al. | |
| 2004/0211228 A1 | 10/2004 | Nishio et al. | |
| 2005/0030175 A1 | 2/2005 | Wolfe | |
| 2005/0080520 A1 | 4/2005 | Kline et al. | |
| 2005/0139420 A1 | 6/2005 | Spoltore et al. | |
| 2005/0251427 A1 | 11/2005 | Dorai et al. | |
| 2005/0275527 A1 | 12/2005 | Kates | |
| 2006/0033625 A1 | 2/2006 | Johnson et al. | |
| 2006/0154642 A1 | 7/2006 | Scannell | |
| 2008/0018474 A1 | 1/2008 | Bergman et al. | |
| 2008/0019392 A1 * | 1/2008 | Lee | H04L 12/66 370/467 |
| 2008/0184272 A1 | 7/2008 | Brownewell | |
| 2008/0285797 A1 | 11/2008 | Hammadou | |
| 2009/0001891 A1 | 1/2009 | Patterson | |
| 2009/0044595 A1 | 2/2009 | Vokey | |
| 2009/0243852 A1 | 10/2009 | Haupt et al. | |
| 2009/0259581 A1 | 10/2009 | Horowitz et al. | |
| 2009/0265193 A1 | 10/2009 | Collins et al. | |
| 2010/0073840 A1 | 3/2010 | Hennessey, Jr. | |
| 2010/0188206 A1 * | 7/2010 | Kates | G08B 19/00 340/521 |
| 2010/0235285 A1 | 9/2010 | Hoffberg | |
| 2010/0299217 A1 | 11/2010 | Hui | |
| 2011/0003577 A1 | 1/2011 | Rogalski et al. | |
| 2011/0040785 A1 * | 2/2011 | Steenberg | G05B 23/0235 707/769 |
| 2011/0077875 A1 | 3/2011 | Tran et al. | |
| 2011/0112660 A1 | 5/2011 | Bergmann et al. | |
| 2011/0161117 A1 | 6/2011 | Busque et al. | |
| 2011/0166714 A1 * | 7/2011 | Stachnik | A62C 35/60 700/282 |
| 2012/0016695 A1 | 1/2012 | Bernard et al. | |
| 2012/0079092 A1 * | 3/2012 | Woxblom | H04L 47/20 709/223 |
| 2012/0101855 A1 | 4/2012 | Collins et al. | |
| 2012/0116820 A1 * | 5/2012 | English | H04L 61/2007 705/4 |
| 2012/0188081 A1 | 7/2012 | Van Katwijk | |
| 2012/0290333 A1 | 11/2012 | Birchall | |
| 2013/0049950 A1 * | 2/2013 | Wohlert | G08B 25/005 340/531 |
| 2013/0085688 A1 * | 4/2013 | Miller | G01F 1/66 702/48 |
| 2013/0096960 A1 | 4/2013 | English et al. | |
| 2013/0144486 A1 | 6/2013 | Ricci | |
| 2013/0159021 A1 | 6/2013 | Felsher | |
| 2013/0226624 A1 | 8/2013 | Blessman et al. | |
| 2013/0234840 A1 * | 9/2013 | Trundle | F24F 11/0086 340/12.53 |
| 2013/0290033 A1 | 10/2013 | Reeser et al. | |
| 2014/0122133 A1 * | 5/2014 | Weisberg | G06Q 40/08 705/4 |
| 2014/0136242 A1 | 5/2014 | Weekes et al. | |
| 2014/0180723 A1 | 6/2014 | Cote et al. | |
| 2014/0201844 A1 | 7/2014 | Buck | |
| 2014/0222329 A1 | 8/2014 | Frey | |
| 2014/0222469 A1 | 8/2014 | Stahl et al. | |
| 2014/0238511 A1 | 8/2014 | Klicpera | |
| 2014/0244997 A1 | 8/2014 | Goel et al. | |
| 2014/0266717 A1 | 9/2014 | Warren et al. | |
| 2014/0340216 A1 | 11/2014 | Puskarich | |
| 2014/0358592 A1 | 12/2014 | Wedig et al. | |
| 2015/0020299 A1 * | 1/2015 | Hsu | E03D 5/105 4/313 |
| 2015/0154712 A1 | 6/2015 | Cook | |
| 2015/0160636 A1 | 6/2015 | McCarthy, III et al. | |
| 2015/0163412 A1 | 6/2015 | Holley et al. | |
| 2015/0170288 A1 | 6/2015 | Harton et al. | |
| 2015/0206249 A1 | 7/2015 | Fini | |
| 2015/0332407 A1 | 11/2015 | Wilson, II et al. | |
| 2015/0364028 A1 | 12/2015 | Child et al. | |
| 2016/0018226 A1 | 1/2016 | Plocher et al. | |
| 2016/0078744 A1 | 3/2016 | Gieck | |
| 2016/0104250 A1 | 4/2016 | Allen et al. | |
| 2017/0304659 A1 | 10/2017 | Chen et al. | |

OTHER PUBLICATIONS

U.S. Appl. No. 14/692,864, Final Office Action, dated Nov. 8, 2017.
U.S. Appl. No. 14/692,946, Final Office Action, dated Oct. 30, 2017.

(56) References Cited

OTHER PUBLICATIONS

U.S. Appl. No. 14/692,953, Nonfinal Office Action, dated Sep. 19, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Nov. 3, 2017.
U.S. Appl. No. 14/873,942, Nonfinal Office Action, dated Nov. 22, 2017.
U.S. Appl. No. 14/873,864, Notice of Allowance, dated Dec. 21, 2017.
U.S. Appl. No. 14/692,864, Nonfinal Office Action, dated May 16, 2017.
U.S. Appl. No. 14/692,946, Nonfinal Office Action, dated Apr. 4, 2017.
U.S. Appl. No. 14/693,021, Nonfinal Office Action, dated Jun. 30, 2017.
U.S. Appl. No. 14/693,034, Nonfinal Office Action, dated May 17, 2017.
U.S. Appl. No. 14/693,039, Nonfinal Office Action, dated Jun. 5, 2017.
U.S. Appl. No. 14/693,057, Nonfinal Office Action, dated Aug. 21, 2017.
U.S. Appl. No. 14/873,823, Final Office Action, dated Mar. 15, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/873,864, Final Office Action, dated Dec. 2, 2016.
U.S. Appl. No. 14/692,943, Nonfinal Office Action, dated Sep. 12, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Nonfinal Office Action, dated Apr. 5, 2017.
U.S. Appl. No. 14/873,864, Nonfinal Office Action, dated Jul. 14, 2016.

* cited by examiner

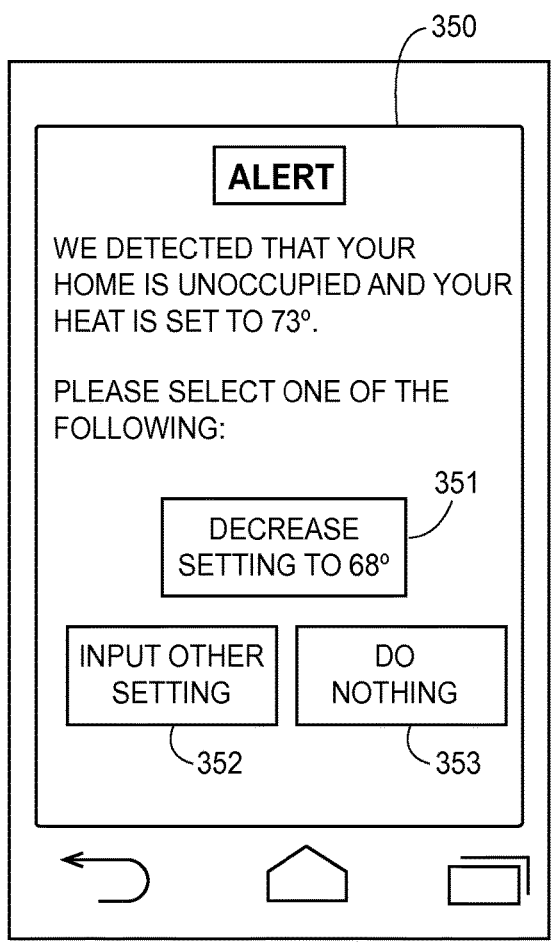
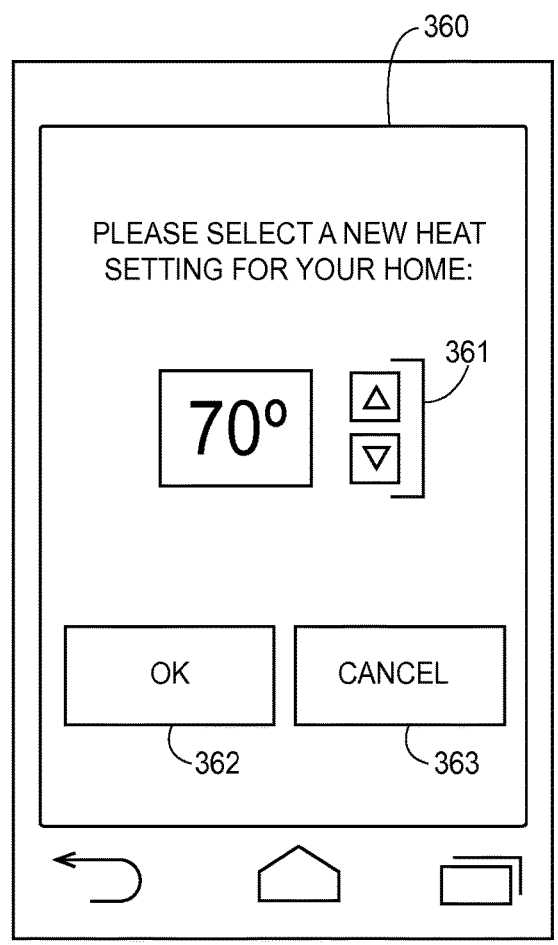
FIG. 3A  FIG. 3B

SYSTEMS AND METHODS FOR MANAGING THE OPERATION OF DEVICES WITHIN A PROPERTY

CROSS-REFERENCE TO RELATED APPLICATIONS

This application claims benefit of the filing date of U. S. Provisional Patent Application Nos. 61/984,541 (filed Apr. 25, 2014, and entitled "HOME INSURANCE AND THE PREVENTION, DETECTION, AND MITIGATION OF HOUSEHOLD DAMAGE"); 62/012,008 (filed Jun. 13, 2014, and entitled "HOME INSURANCE AND THE PREVENTION, DETECTION, AND MITIGATION OF HOUSEHOLD DAMAGE"); 62/061,000 (filed Oct. 7, 2014, and entitled "SYSTEMS AND METHODS FOR AUTOMATICALLY MITIGATING RISK OF PROPERTY DAMAGE"); 62/061,003 (filed Oct. 7, 2014, and entitled "SYSTEMS AND METHODS FOR HOMEOWNER-DIRECTED RISK OF PROPERTY DAMAGE MITIGATION"); 62/061,018 (filed Oct. 7, 2014, and entitled "SYSTEMS AND METHODS FOR DETERMINING CAUSE OF LOSS TO A PROPERTY"); 62/061,016 (filed Oct. 7, 2014, and entitled "SYSTEMS AND METHODS FOR PREDICTIVELY GENERATING AN INSURANCE CLAIM"); 62/061,012 (filed Oct. 7, 2014, and entitled "SYSTEMS AND METHODS FOR ASSIGNING DAMAGE CAUSED BY AN INSURANCE-RELATED EVENT"); 62/061,009 (filed Oct. 7, 2014, and entitled "SYSTEMS AND METHODS FOR COMMUNITY-BASED CAUSE OF LOSS DETERMINATION"); 62/060,777 (filed Oct. 7, 2014, and entitled "SYSTEMS AND METHODS FOR MANAGING INSURANCE ASSOCIATED WITH DEVICES POPULATED WITHIN A PROPERTY"); 62/061,007 (filed Oct. 7, 2014, and entitled "SYSTEMS AND METHODS FOR AUTOMATICALLY MITIGATING RISK OF WATER DAMAGE"); 62/060,808 (filed Oct. 7, 2014, and entitled "SYSTEMS AND METHODS FOR MANAGING INSURANCE BASED ON DEVICE LOCATION WITHIN A PROPERTY"); 62/060,847 (filed Oct. 7, 2014, and entitled "SYSTEMS AND METHODS FOR MANAGING INSURANCE FOR DEVICES LOCATED WITHIN A PROPERTY BASED ON INSURANCE-RELATED EVENTS"); and 62/073,695 (filed Oct. 31, 2014, and entitled "SYSTEMS AND METHODS FOR MANAGING THE OPERATION OF DEVICES WITHIN A PROPERTY")—which are all hereby incorporated by reference in their entireties.

FIELD OF THE DISCLOSURE

The present disclosure generally relates to managing operation of a plurality of devices within a property. More particularly, the present disclosure may relate to detecting an unoccupied property and facilitating operation of smart and/or other devices within the unoccupied property and communicating information associated therewith.

BACKGROUND

Homeowner and personal property insurance exists to provide financial protection against damage to the home, as well as personal property owned by the policyholder, respectively. With the proliferation of the "internet of things," more household devices and items are gaining communication and network connectivity capabilities. The new capabilities are enabling easier data detection and more accurate information and metrics. However, the channels to control devices and items as a response to certain conditions are limited. Additionally, current insurance policy processing systems associated with homeowner and personal property insurance may not account for the connected devices.

SUMMARY

The present embodiments may, inter alia, dynamically manage the operation of a set of smart devices, smart appliances, and/or other devices that are populated within a property in response to certain conditions being met. Each of the set of devices may be configured to monitor various conditions of the property. A controller may interface with the set of devices to receive sensor data from the set of devices and, based upon the sensor data, detect various conditions, such as whether the property is occupied or not. There may be desired operation states of the set of devices that are associated with the conditions of the property. For example, if the property is unoccupied, the property owner may want all of the windows and doors of the property to be locked. The controller may be configured to generate appropriate command(s) to issue to one or more of the set of devices, whereby the one or more devices executes the appropriate command(s) to enter the desired operation state. For example, the controller may generate locking commands that, when executed by locking mechanisms, cause the corresponding doors and windows to lock. In some aspects, the controller may enable an individual (e.g., a remote homeowner) to remotely control the set of devices. In some further aspects, the controller may sense damage to a property and may generate proposed insurance claims according to the damage. A customer may receive the proposed insurance claims and may be able to accept, reject, and/or modify the claims accordingly. The controller and/or an insurance provider may facilitate the insurance claim processing with the customer so that the customer is afforded an effective and efficient channel for claims processing without having to manually initiate, populate, and/or submit insurance claims.

In one aspect, a computer-implemented method of interfacing with a plurality of devices populated within a property may be provided. The plurality of devices populated within the property may be (a) connected to a hardware or smart home controller, and/or (b) in wireless communication with a remote processor (or server), such as a remote processor associated with an insurance provider. The plurality of devices may be configured to monitor conditions associated with the property. The method may include (1) collecting, via wired or wireless communication and/or a communication network, sensor data from the plurality of devices at the smart home controller or remote processor; (2) determining, from the sensor data (at or via the smart home controller or remote processor), that the property is unoccupied; and/or (3) generating (at or via the smart home controller or remote processor) a command or data transmission to issue to a first device of the plurality of devices based upon the determination that the property is unoccupied. The method may further include (4) transmitting the command from the smart home controller or remote processor to the first device within the property via the communication network (or wired or wireless communication). After which, the first device may execute the command to adjust operation of the first device. The method may also include communicating to an individual associated with the property and/or transmitting (from the smart home controller or remote processor), to a mobile device or other computing device of the individual associated with the property, an indication that the command was transmitted to the first device. The method may include additional, fewer, or alternate actions, including those discussed elsewhere herein.

In another aspect a system configured to interface with a plurality of devices populated within a property may be provided. The system may be configured to monitor conditions associated with the property. The system may include (a) a memory adapted to store non-transitory computer executable instructions; (b) a communication module adapted to communicate data; and/or (c) a hardware controller including a processor and adapted to interface with the communication module. The processor may be configured to execute the non-transitory computer executable instructions to cause the processor to (1) collect, via the communication module, sensor data from the plurality of devices, (2) determine, from the sensor data, that the property is unoccupied, and/or (3) generate a command to issue to a first device of the plurality of devices based upon the determination that the property is unoccupied. The processor may be further configured to (4) transmit the command to the first device via the communication module. The first device may be configured to execute the command to adjust operation of the first device, and/or (5) communicate, to a mobile or other communications device of an individual associated with the property via the communication module, an indication that the command was transmitted to the first device. The system may include additional, less, or alternate functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 3A-3C depict exemplary interfaces associated with enabling an individual to manage device operation within a property, in accordance with some embodiments;

DETAILED DESCRIPTION

Figure 1:
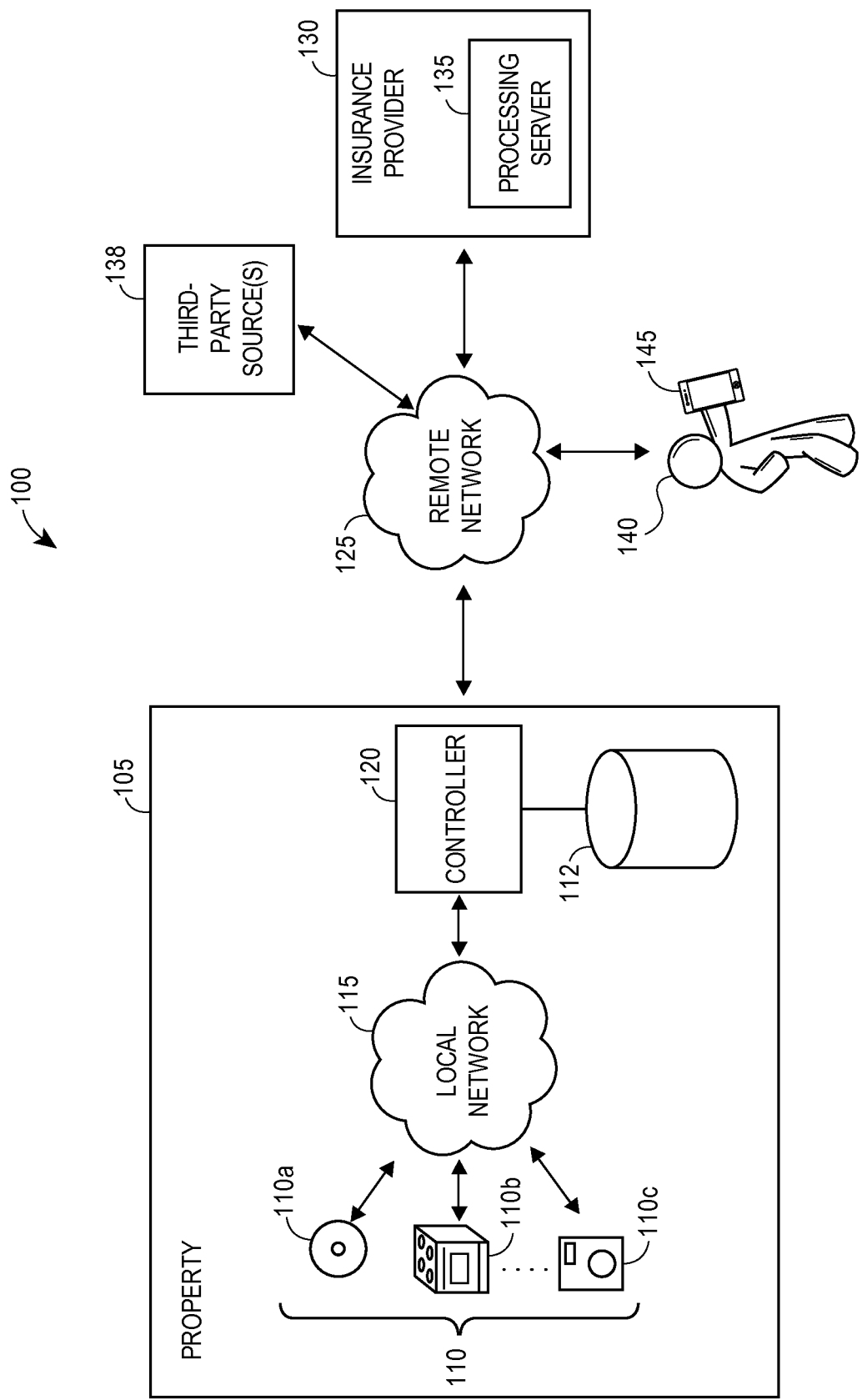
FIG. 1 depicts an exemplary environment including components and entities associated with managing device operation and facilitating insurance policy processing, in accordance with some embodiments.

The present embodiments may relate to, inter alia, managing operation of smart or other devices or personal property within a home or other type of property, such as smart household furniture, appliances, electronics, vehicles (e.g., cars, boats, motorcycles), and/or other personal belongings (e.g., clothing, jewelry, antiques). In particular, a central controller may determine, from various sensor data, an occupancy state of the property (i.e., whether any individuals are present within the property), and may determine various actions to take to manage operation of the personal property based upon the occupancy state. The various actions may be configured to cause one or more of the devices to enter into an operation state that is tailored to a preferred property environment. The central controller may further enable an individual, such as a property owner, to remotely control operation of the devices such as to further mitigate any negative impact or damage to the property.

In some circumstances, even with the mitigating benefits of the central controller, there may be an insurance-related event that may cause damage to the property and/or to the devices of the property. In some aspects, the central controller may detect the insurance-related event and may collect sensor data that indicates damage to the property, and/or to the devices of the property, such as damage caused by water, fire, hail, wind, and/or other sources. The present embodiments may also relate to (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities.

In one aspect, the central controller may be a local smart home controller and/or a remote processor or server associated with an insurance provider. For instance, a home or property may have a "smart" central controller, and/or an insurance provider may have a remote processor or server. Either or both of which may be wirelessly connected, or connected via hard-wire, with various household related items, devices, and/or sensors. For instance, a smart home controller and/or insurance provider remote processor may be in wired or wireless communication with various smart devices and/or smart appliances located about an insured home.

The central controller may be associated with any type of property, such as homes, office buildings, restaurants, farms, and/or other types of properties. Noted above, the central controller may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller, may be equipped with a processor, memory unit, software applications, wireless transceivers, local power supply, various types of sensors, and/or other components.

Each of the smart devices may be included on an inventory list associated with the property. Further, the inventory list may include a monetary value associated with each smart device. In some embodiments, the monetary value may correspond to the replacement value, the MSRP, or other metric associated with the corresponding smart device. The monetary value may be manually entered by a user or automatically determined based upon various factors. The smart devices themselves may store the monetary value, such as in a data tag or other type of storage. The inventory list may detail a location (e.g., GPS coordinates, a room of the property, an area or section of the property, or other location indication) of each of the smart devices. In this regard, multiple of the smart devices may be associated with a single area or location of the property (e.g., a basement, a bathroom, a kitchen, a first floor, etc.).

The central controller may remotely gather data from the smart devices (or sensors associated therewith) dispersed around or otherwise interconnected within the property. The central controller may examine the gathered data to determine an occupancy state or other condition of the property. The occupancy state may indicate whether any individuals are currently located within or in proximity to the property, whereby the property may be deemed unoccupied if no individuals are currently located within or in proximity to the property or may be deemed occupied if at least one individual is located within or in proximity to the property. The central controller may also receive data from an insurance provider (or other third party sources) that monitors potential risks to the property, such as inclement weather, crime patterns, recall data pertaining to items disposed on or proximate to the property, and/or other risks. The central controller may analyze the data and automatically detect actual or potential issues that may result in damage to the property.

In some embodiments, there may be a preferred operation state for various ones of the smart devices based upon the occupancy state and/or on the actual or potential issues that may result in damage to the property. The preferred operation state may be designed to reduce costs, reduce energy output, reduce risk of damage or incident, perform an action that an individual normally or habitually performs, and/or facilitate other benefits. The central controller may generate a command or action that corresponds to the preferred operation state, and/or transmit the command or action to the appropriate smart device (and/or a mobile device of the insured). Upon receipt, the appropriate smart device may execute the command to cause the smart device to enter the preferred operation state. Accordingly, the benefits associated with the preferred operation state may be realized.

In some situations, damage may occur to the property, whereby the central controller may determine the damage from data received from the smart devices. Based upon determining the damage, the central controller may facilitate various insurance policy processing and applications. In particular, the central controller (such as the smart home controller and/or insurance provider remote processor or server) may process or manage insurance covering the home, personal belongings, vehicles, etc.

The systems and methods discussed herein address a challenge that is particular to home automation. In particular, the challenge relates to a lack of user ability to effectively control certain components within a property when the property is unoccupied. This is particularly apparent when the user is not aware of any property issues and, if the user is aware of a property issue, the user is not able to properly mitigate the issue while remote from the property. Instead of physically traveling to the property or notifying additional individuals or emergency services to manually mitigate the issue, as required by conventional home systems, the systems and methods dynamically determine how to mitigate an issue and proactively issue commands to one or more devices within the property to adjust operation accordingly. In additional implementations, the systems and methods enable remote users to adjust operation according to any identified issues. Therefore, because the systems and methods employ dynamic and remote operation of connected devices within a property, the systems and methods are necessarily rooted in computer technology in order to overcome the noted shortcomings that specifically arise in the realm of home automation.

Similarly, the systems and methods provide improvements in a technical field, namely, home automation. Instead of the systems and methods merely being performed by hardware components using basic functions, the systems and methods employ complex steps that go beyond the mere concept of simply retrieving and combining data using a computer. In particular, the hardware components compile operation data of connected devices, analyze the operation data, determine how to mitigate an issue, communicate relevant data between or among a set of devices, dynamically adjust device operation, and enable remote device operation by a user, among other functionalities. This combination of elements impose meaningful limits in that the operations are applied to improve home automation by improving the consolidation and analysis of operation data, and by facilitating and/or enabling the effective adjustment of connected device operation in a meaningful and effective way.

The systems and methods therefore may offer numerous benefits. In particular, an individual, such as a homeowner, may be notified of preferred operation states and/or potential issues, and may be afforded the ability to remotely manage device operation to enter the preferred operation states and/or prevent the potential issues. The systems and methods may further offer a benefit to customers by automatically populating proposed insurance claims based upon any damage to smart devices, and/or facilitating any resulting insurance processing. Further, as a result of the automatic claim generation, insurance providers may experience a reduction in the amount of processing and/or modifications necessary to process the claims. Moreover, by implementing the systems and methods, insurance providers may stand out as a cost-effective insurance provider, thereby retaining existing customers and attracting new customers. It should be appreciated that further benefits to the systems and methods may be envisioned.

I. EXEMPLARY EMBODIMENTS

In one aspect, the central controller (such as a smart home controller and/or an insurance provider remote processor or server) may maintain information related to preferred operation states of a plurality of devices within a property. The preferred operation state may be designed to reduce costs, reduce energy output, reduce risk of damage or incident, perform an action that an individual normally or habitually performs, and/or facilitate other benefits.

For example, in an unoccupied property, the preferred operation state of a heating setting for a smart thermostat may be 65 degrees. In some embodiments, the central controller may determine or generate the preferred operation states, and/or the preferred operation states may be specified by an individual such as the property owner. Further, the preferred operation states may be associated with an occupancy state of the property.

The central controller may be configured to access or generate commands that cause the plurality of devices to enter the preferred operation states. For example, for a heating setting of 65 degrees, the corresponding command for the smart thermostat may cause the smart thermostat to set its heating setting at 65 degrees.

In another aspect, the central controller (such as a smart home controller and/or an insurance provider remote processor or server) may collect sensor data from a plurality of devices populated within a property, and/or may analyze the sensor data to determine whether the property is occupied. If the property is unoccupied, the central controller may identify an appropriate operation state for one or more of the plurality of devices, and/or may generate one or more commands associated with the appropriate operation state. The central controller may communicate the one or more commands to the one or more devices and, upon receipt, the one or more devices may execute the one or more commands to cause the one or more devices to enter into the appropriate operation state.

In a further aspect, the property may have an associated insurance policy that covers damage to the property and/or to the devices thereof. In some situations, the central controller (such as a smart home controller and/or an insurance provider remote processor or server) may detect damage to the plurality of devices from any collected sensor data. Based upon the sensor data, the central controller may calculate an amount of damage to the plurality of devices and/or to the property itself. The central controller may generate a proposed insurance claim that includes the calculated damage, and/or may communicate the proposed insurance claim to a customer having the insurance policy (which, in some cases, may be the owner of the property). The central controller and/or an insurance provider may facilitate processing of the proposed insurance claim, whereby the central controller and/or the insurance provider may enable the customer to accept, deny, and/or modify the proposed insurance claim.

II. EXEMPLARY ENVIRONMENT AND COMPONENTS FOR MANAGING DEVICE OPERATION AND PROCESSING INSURANCE POLICIES

FIG. 1 depicts an exemplary environment 100 including components and entities for managing devices associated with a property and/or processing insurance policies associated therewith. Although FIG. 1 depicts certain entities, components, and devices, it should be appreciated that additional or alternate entities and components are envisioned.

As illustrated in FIG. 1, the environment 100 may include a property 105 that contains a controller 120 and a plurality of devices 110 that may be each connected to a local communication network 115. Each of the plurality of devices 110 may be a "smart" device that may be configured with one or more sensors capable of sensing and communicating operating data associated with the corresponding device 110. As shown in FIG. 1, the plurality of devices 110 may include a smart alarm system 110a, a smart stove 110b, and/or a smart washing machine 110c. Each of the plurality of devices 110 may be located within, or proximate to, the property 105 (generally, "on premises"). Although FIG. 1 depicts only one property 105, it should be appreciated that multiple properties are envisioned, each with its own controller and devices. Further, it should be appreciated that additional or fewer devices may be present in the property 105.

In some cases, the plurality of devices 110 may be purchased from a manufacturer with the "smart" functionally incorporated therein. In other cases, the plurality of devices 110 may have been purchased as "dumb" devices and subsequently modified to add the "smart" functionality to the device. For example, a homeowner may purchase an alarm system that installs sensors on or near a door to detect when a door has been opened and/or unlocked.

The plurality of devices 110 may be configured to communicate with a controller 120 via the local communication network 115 (and/or directly or indirectly to one or more processors or servers associated with the insurance provider 130, such as via network 125). The local communication network 115 may facilitate any type of data communication between devices and controllers located on or proximate to the property 105 via any standard or technology (e.g., LAN, WLAN, any IEEE 802 standard including Ethernet, and/or others). The local communication network 115 may further support various short-range communication protocols such as Bluetooth®, Bluetooth® Low Energy, near field communication (NFC), radio-frequency identification (RFID), and/or other types of short-range protocols, such as ZigBee®, Z-Wave®, Insteon®, or universal powerline bus (UPB).

According to aspects, the plurality of devices 110 may transmit, to the controller 120 via the local communication network 115 (and/or to the insurance provider 130 remote processor or server), operational data gathered from sensors associated with the plurality of devices 110. The operational data may be audio data, image or video data, status data, and/or other data or information. For example, the operational data may indicate that a window has been shattered; the presence of a person, fire, or water in a room; the sound made near a smart device; and/or other information pertinent to an operation state or status of the plurality of devices 110. For further example, the operational data may include motion data that may indicate whether any individuals are within the property 105 (i.e., whether the property 105 is occupied or unoccupied). The operational data may include a timestamp representing the time that the operational data was recorded.

In some cases, the controller 120 may analyze the sensor data to determine whether any additional supporting data is needed for any of the analyses. For example, the initial data may consist of a barometer reading or weather data associated with a strong storm. The controller 120 may determine that pre-incident aerial data may be helpful to supplement the initial data. As a result, the controller 120 may compare the initial storm data with the pre-incident aerial data to facilitate various functionalities, such as identify a cause of loss, more accurately assess property damage, and perform other analyses.

In some cases, the plurality of devices 110 may transmit, to the controller 120 (and/or to the insurance provider 130 remote processor or server), various data and information associated with the plurality of devices 110. In particular, the data and information may include location data within the property, as well as various costs and prices associated with the plurality of devices 110. For example, a washing machine may include a component, such as a data tag that stores a location of the washing machine within the property 105, a retail price of the washing machine, and/or replacement costs of various parts of (or the entirety of) the washing machine. The various data and information may be programmable and updatable by an individual or automatically by the controller 120.

The controller 120 may be coupled to a database 112 that stores various operational data and information associated with the plurality of devices 110. Although FIG. 1 depicts the database 112 as coupled to the controller 120, it is envisioned that the database 112 may be maintained in the "cloud" such that any element of the environment 100 capable of communicating over either the local network 115 or one or more other networks 125 may directly interact with the database 112. In some embodiments, the database 112 may organize the operational data according to which individual device 110 the data is associated and/or the room or subsection of the property in which the data was recorded.

Further, the database 112 may maintain an inventory list that includes the plurality of devices 110, as well as various data and information associated with the plurality of devices 110 (e.g., locations, replacement costs, etc.). In embodiments, the database 112 may maintain various operation states of the plurality of devices 110. In particular, the operation states may specify various settings of the plurality of devices 110 such that when the respective device is configured at the setting(s), the respective device will operate in the corresponding operation state. For example, an operation state for a smart thermostat may be "heat conservation" whereby the corresponding setting is 64 degrees (as opposed to a more "normal" 70 degree setting). It should be appreciated that each operation state may specify settings for more than one of the devices 110.

The controller 120 may be configured to communicate with other components and entities such as an insurance provider 130 (and/or one or more processors or servers associated with the insurance provider 130) and various third party source(s) 138 via the network(s) 125. According to embodiments, the network(s) 125 may facilitate any data communication between the controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, Wi-Fi, and/or others). In some cases, both the local network 115 and the network 125(s) may utilize the same technology.

Generally, the insurance provider 130 may be any individual, group of individuals, company, corporation, or other type of entity that may issue insurance policies for customers, such as a home insurance policy associated with the property 105. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130.

Further, although the present disclosure describes the systems and methods as being facilitated in part by the insurance provider 130, it should be appreciated that other non-insurance related entities may implement the systems and methods. For example, a general contractor may aggregate the insurance-risk data across many properties to determine which appliances or products provide the best protection against specific causes of loss, and/or deploy the appliances or products based upon where causes of loss are most likely to occur. Accordingly, it is not necessary for the property 105 to have an associated insurance policy for the property owners to enjoy the benefits of the systems and methods.

The third-party source(s) 138 may represent any entity or component that is configured to obtain, detect, and/or determine data or information that may be relevant to various insurance-related events. For example, the one third-party source 138 may be a weather source that generates data associated with forecasted weather events that may the property 105 and/or the devices 110 thereof. The third-party source(s) 138 may be configured to communicate the data or information to the controller 120 via the network(s) 125, whereby the controller 120 may examine the data or information to identify an insurance-related event that is forecasted to occur, that is imminent, or that is occurring/has occurred.

According to some aspects, the controller 120 (and/or insurance provider 130 remote processor or server 135), may be configured to determine an occupancy state of the property 105 based upon data received from the plurality of devices 110. The controller 120 (and/or insurance provider 130 remote processor or server 135), may also interface with the database 112 to retrieve various operating states of the plurality of devices 110 that are preferred based upon the occupancy state of the property 105. The controller 120 (and/or insurance provider 130 remote processor or server 135) may be configured to generate commands that are designed to cause the plurality of devices 110 to enter the preferred operating states. The controller 120 (and/or insurance provider 130 remote processor or server 135) may then transmit the commands to the plurality of devices 110 and, upon receipt of the commands, the plurality of devices 110 may execute the commands to cause the plurality of devices 110 to enter the preferred operating states.

The controller 120 (and/or insurance provider 130 remote processor or server 135) may also be in communication, via the network(s) 125, with an electronic device 145 associated with an individual 140. In embodiments, the individual 140 may have an insurance policy (e.g., a home insurance policy) for the property 105 or a portion of the property 105, and/or may otherwise be associated with the property 105 (e.g., the individual 140 may live in the property 105). The electronic device 145 may be a mobile device (such as a smartphone, a desktop computer, a laptop, a tablet, a phablet, a smart watch, smart glasses, computing device capable of radio frequency (RF) or wireless communication, and/or any other electronic device).

In some implementations, the controller 120 (and/or insurance provider 130 remote processor or server 135) may communicate, to the individual 140 via the electronic device 145, an indication of the operation of the plurality of devices 110, such as the commands transmitted to the plurality of devices 110. Further, the controller 120 (and/or insurance provider 130 remote processor or server 135) may enable the individual 140 to remotely control various ones of the plurality of devices 110 via the electronic device 145.

According to some other implementations, the controller 120 (and/or insurance provider 130 remote processor or server 135) may detect damage to any of the plurality of devices 110 and/or to other portions of the property 105. The controller 120 (and/or insurance provider 130 remote processor or server 135) may also generate a proposed insurance claim that indicates the damage and transmit, via the network 125 or wireless communication, the proposed insurance claim related to the electronic device 145. The proposed insurance claim may contain pre-populated fields that indicate various information and data, such as causes of loss (e.g., water, wind, fire, etc.); damaged devices; costs associated with the damaged devices; time, date, location of the insurance-related event; and/or other information included in an insurance claim. The controller 120 (and/or insurance provider 130 remote processor or server 135) may also transmit any modifications to insurance policies based upon detected data from the plurality of devices 110. In response, the homeowner 140 may accept the proposed insurance claim and/or make modifications to the proposed insurance claim, or otherwise accept/reject any modifications to the insurance policy.

The electronic device may then transmit, via the network 125 and/or wireless communication, the accepted or modified insurance claim back to the controller 120 (and/or insurance provider 130 remote processor or server 135). The controller 120 may facilitate any processing of the insurance claim with the processing server 135 of the insurance provider 130. As noted herein, in some implementations, the processing server 135 may facilitate the proposed insurance claim communications and processing directly with the customer 140.

III. EXEMPLARY COMMUNICATION FLOW FOR MANAGING DEVICE OPERATION AND ASSOCIATED INSURANCE PROCESSING

Figure 2:
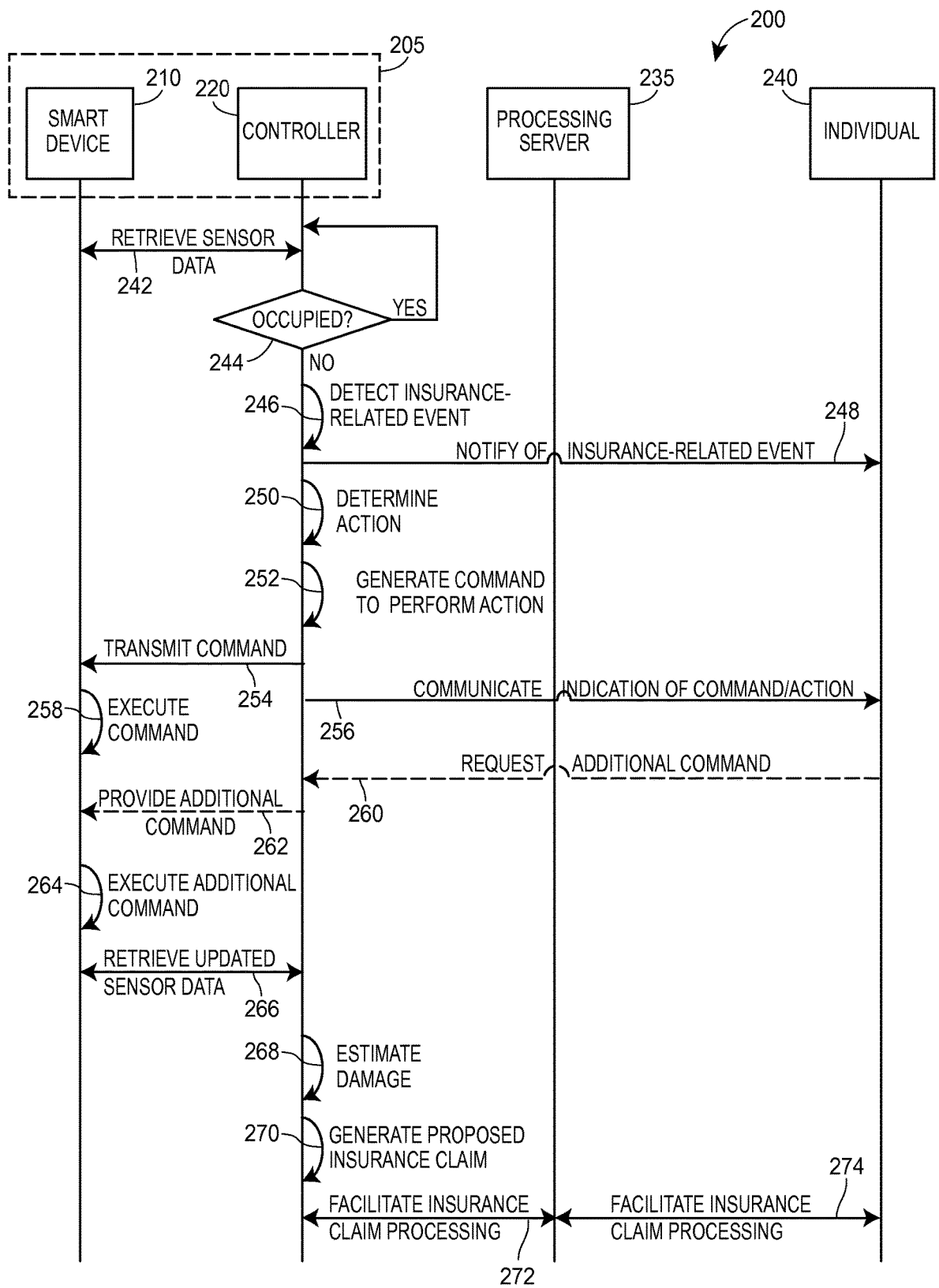
FIG. 2 depicts an exemplary signal diagram associated with retrieving and compiling device data and facilitating device operation associated therewith, in accordance with some embodiments.

Referring to FIG. 2, illustrated is an exemplary signal diagram 200 associated with managing operation of smart devices 210 within a property 205, and managing insurance policies associated therewith. In particular, FIG. 2 includes smart devices 210 (such as the plurality of devices 110 as described with respect to FIG. 1), a controller 220 (such as the controller 120 as described with respect to FIG. 1), a processing server 235 (such as the processing server 135 as described with respect to FIG. 1) that may be associated with an insurance provider, and an individual 240 (such as the individual 140 as described with respect to FIG. 1). The individual 240 may have an associated electronic device capable of communication with the other components, such as the electronic device 145 as described with respect to FIG. 1.

Further, the customer 240 may be the policyholder for (or have access to) an insurance policy issued by the insurance provider and associated with the property 205. For example, the customer 240 may have a homeowners or personal articles insurance policy that covers damage or destruction to the smart devices 210. It should be appreciated that the smart devices 210 may be populated within the property 205, and/or in proximity to the property 205.

The signal diagram 200 may begin when the controller 220 (and/or insurance provider 130 remote processor or server 135) retrieves (242) sensor data from one or more of the smart devices 210. In some implementations, the controller 220 (and/or insurance provider 130 remote processor or server 135) may retrieve the sensor data periodically. In other implementations, the smart devices 210 may automatically provide the sensor data to the controller 220 (and/or insurance provider 130 remote processor or server 135) at periodic times or when the smart devices 210 detect or sense new data.

It should be appreciated that the controller 220 (and/or insurance provider 130 remote processor or server 135) may retrieve the sensor data via a wireless or wired LAN implemented within the property 205. The controller 220 (and/or insurance provider 130 remote processor or server 135) may analyze the sensor data to determine (244) whether the property 205 is occupied or not.

It should be appreciated that the controller 220 (and/or insurance provider 130 remote processor or server 135) may employ various techniques and calculations to determine occupancy. In one example, the controller 220 (and/or insurance provider 130 remote processor or server 135) may analyze motion sensor data from various of the smart devices 210 and/or determine that the motion sensor data does not indicate any activity over a certain period of time (e.g., five, ten, thirty minutes, etc.). In another example, the controller 220 (and/or insurance provider 130 remote processor or server 135) may analyze alarm system data to determine that the alarm system has armed the property 205 (and thus that the property 205 in unoccupied).

If the controller 220 (and/or insurance provider 130 remote processor or server 135) determines that the property 205 is occupied ("YES"), processing may return to the beginning of the signal diagram 200 in which the controller 220 (and/or insurance provider 130 remote processor or server 135) may retrieve additional or updated sensor data from the smart devices 210. If the controller 220 (and/or insurance provider 130 remote processor or server 135) determines that the property 205 is not occupied ("NO"), then the controller 220 (and/or insurance provider 130 remote processor or server 135) may continue with processing of the signal diagram 200.

In some cases, the controller 220 (and/or insurance provider 130 remote processor or server 135) may detect (242) an insurance-related event that has a potential to cause damage to or otherwise impact the property 205. In particular, the insurance-related event may be an event that has the potential to cause damage by water, fire, hail, wind, and/or other sources. In one implementation, the controller 220 (and/or insurance provider 130 remote processor or server 135) may detect the insurance-related event from data received from a third-party source (such as one of the third-party sources 138 as discussed with respect to FIG. 1) or from an insurance provider 130 (such as the insurance provider 130 as discussed with respect to FIG. 1). In another implementation, the controller 220 (and/or insurance provider 130 remote processor or server 135) may detect the insurance-related event from the retrieved sensor data.

The controller 220 (and/or insurance provider 130 remote processor or server 135) may also notify (248) the individual 240 of the insurance-related event by sending an indication of the insurance-related event along with any relevant details or information to the individual 240. For example, the controller 220 (and/or insurance provider 130 remote processor or server 135) may receive notification of an approaching hurricane in an area of the property 205, and may send an alert of the hurricane to the individual 240.

Irrespective of whether the controller 220 (and/or insurance provider 130 remote processor or server 135) detects an insurance-related event, the controller 220 (and/or insurance provider 130 remote processor or server 135) may also determine (250) an action to take to manage operation of one or more of the smart devices 210. In some implementations, the action may be associated with a preferred or effective operation state of the smart device 210 when the property 205 is unoccupied. For example, if the smart device 210 is an air conditioning unit and the property 205 is unoccupied, then it may be preferred to have the air conditioning unit running less frequently than when the property 205 is occupied, whereby the corresponding action is to set the cooling temperature to a specific setting. For further example, if the smart device 210 is an alarm system and the property 205 is unoccupied, then it may be preferred to have the alarm system engaged, whereby the corresponding action is to activate/engage the alarm system.

In other implementations, the action may account for any detected insurance-related event. For example, if the controller 220 (and/or insurance provider 130 remote processor or server 135) detects that a flood warning has been issued for the area in which the property 205 is located, then the controller 220 (and/or insurance provider 130 remote processor or server 135) may determine that the basement windows of the property 205 should be closed (with the corresponding action being to close the basement windows).

It should be appreciated that some actions have a greater priority than other actions. Accordingly, the controller 220 (and/or insurance provider 130 remote processor or server 135) may prioritize one action over another action, such as in cases in which a specific urgent action is needed or required. Further, it should be appreciated that two or more actions may be related, whereby if the controller 220 (and/or insurance provider 130 remote processor or server 135) identifies a first action to perform, then then controller 220 (and/or insurance provider 130 remote processor or server 135) may identify a second related action. For example, if the controller 220 (and/or insurance provider 130 remote processor or server 135) determines to lock all doors of the property 205, then the controller 220 (and/or insurance provider 130 remote processor or server 135) may also determine to engage an alarm system of the property 205.

After the action is determined in (250), the controller 220 (and/or insurance provider 130 remote processor or server 135) may generate (252) a command to perform the action. Continuing with the above examples, if the action is to reduce the air conditioning unit operation, the command may be to set a thermostat setting of the property to a higher temperature (so that the air conditioning unit will switch "on" less frequently). If the action is to engage the alarm system, then the command may be directed to the alarm system to cause the alarm system to activate itself. If the action is to close the basement windows, then the command may be directed to one or more of the basement windows to cause the basement windows to close themselves.

After generating the command, the controller 220 (and/or insurance provider 130 remote processor or server 135) may transmit (254) the command to the appropriate smart device 210. The controller 220 (and/or insurance provider 130 remote processor or server 135) may transmit the command via a wired or wireless LAN. Upon receipt of the command, the appropriate smart device 210 may execute (258) the command. By executing the command, the appropriate smart device 210 may enter the preferred operation state and/or otherwise execute the action identified by the controller 220 (and/or insurance provider 130 remote processor or server 135) in (250).

The controller 220 (and/or insurance provider 130 remote processor or server 135) may also communicate (256) an indication of the command/action to the individual 240 so that the individual 240 may be notified of the determined action and generated command. In some cases, the individual 240 may want to modify the command or otherwise direct one or more of the smart devices 210 to execute other actions. For example, if the command is to active the alarm system and the individual 240 does not want the alarm system activated, then the individual 240 may cancel the action to activate the alarm system. For further example, if the command is to record a "favorite" television program on a particular channel and the individual 240 instead wants to record another television program, then the individual 240 may specify that a recording device records the other television program. The individual 240 may therefore request (260) the controller 220 (and/or insurance provider 130 remote processor or server 135) to provide an additional command to an appropriate smart device 210. The additional command may correspond to an additional operation for the appropriate smart device 210. In some cases, the additional command may be in lieu of the original command generated in (252), such that the appropriate smart device 210 does not execute the original command.

After receiving the additional command, the controller 220 (and/or insurance provider 130 remote processor or server 135) may provide (262) the additional command to the appropriate smart device 210, for example via a wired or wireless LAN. Upon receipt of the additional command, the appropriate smart device 210 may execute (264) the additional command. By executing the additional command, the appropriate smart device 210 may enter the additional operation that may be preferred by the individual 240.

In some situations, the detected insurance-related event may occur. In particular, the detected insurance-related event may occur prior to, concurrently with, or subsequent to the appropriate smart device executing the command (and/or executing the additional command). The insurance-related event may also cause damage to one or more of the smart devices 210 or otherwise to the property 205. The controller 220 (and/or insurance provider 130 remote processor or server 135) may retrieve (266) updated sensor data from one or more of the smart devices 210 (i.e., devices that have been impacted by or potentially impacted by the insurance-related event). Based upon the updated sensor data, the controller 220 (and/or insurance provider 130 remote processor or server 135) may estimate (268) an amount of damage to the corresponding smart devices 210 (and/or to various portions or areas of the property 205). In particular, the sensor data may indicate any damage to the corresponding smart devices 210. For example, a window sensor may provide data indicating that a window has been broken. The controller 220 (and/or insurance provider 130 remote processor or server 135) may estimate the amount of damage using locally-stored or remotely-accessed (e.g., from the corresponding smart devices 210) cost data, replacement data, and/or other data. In some implementations, the corresponding insurance policy may specify cash or replacement values for the smart devices 210 and/or other components of the property 205.

Responsive to estimating any damage to the smart devices 210 and/or the property 205, the controller 220 (and/or insurance provider 130 remote processor or server 135) may generate (270) a proposed insurance claim for the insurance policy. In particular, the proposed insurance claim may indicate an estimated amount of damage to the smart devices 210 and/or the property 205 (and/or any additional items/devices), and other information. The estimated amount of damage may correspond to the estimated amount of damage calculated in (268) and/or to the cash or replacement values specified in the insurance policy.

In an optional embodiment, the controller 220 may facilitate a modification to the proposed insurance claim with the processing server 235, such as an insurance provider remote processor or server. In particular, the processing server 235 may modify any of the information or data included in the proposed insurance claim, or may add or remove any information or data to or from the proposed insurance claim. For example, the processing server 235 may determine that an estimated amount of damage to a smart refrigerator specified in the proposed insurance claim is too low, and may modify the estimated amount of damage accordingly.

The controller 220 may facilitate (272) processing of the proposed insurance claim with the processing server 235 and/or may facilitate (274) processing of the proposed insurance claim directly with the individual 240. In another scenario, the processing server 235 may facilitate processing of the proposed insurance claim with the individual 240. In particular, the controller 220 may communicate the proposed insurance claim to the customer 240 (optionally, via the processing server 235), where the proposed insurance claim identifies any damaged devices or items and includes a claim amount associated with the damaged devices or items. In embodiments, the controller 220 (and/or insurance provider 130 remote processor or server 135) may communicate the proposed insurance claim to the customer 240 via various local or wide area networks. The customer 240 may either accept or reject the proposed insurance claim. If the customer 240 rejects the proposed insurance claim, processing may end. If the customer 240 accepts the proposed insurance claim, the controller 220 may facilitate a processing of the insurance claim with the processing server 235. In particular, the processing server 235 may examine the proposed insurance claim, and either approve or deny the proposed insurance claim, as known in the art.

In some alternate embodiments, the processing server 235 may facilitate the proposed insurance claim processing directly with the customer 240. For example, the customer 240 may access, via an electronic device, an application of the insurance provider, where the application notifies the customer 240 of a proposed insurance claim. In this regard, the customer 240 may communicate directly with the processing server 235 in lieu of the controller 220, where the processing server 235 may facilitate any appropriate changes directly with the customer 240.

IV. EXEMPLARY USER INTERFACES FOR MANAGING DEVICE OPERATION

Figure 3C:
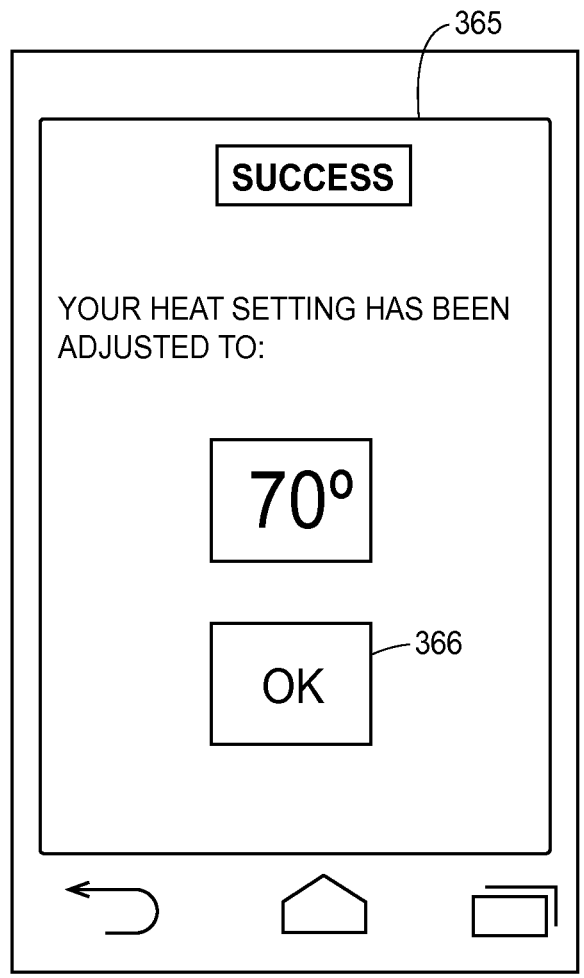

FIGS. 3A-3C illustrate exemplary interfaces associated with example commands and actions for smart devices. An electronic device (e.g., a mobile device, such as a smartphone) may be configured to display the interfaces and/or receive selections and inputs via the interfaces. For example, a dedicated application associated with an insurance provider (or with a controller) and that is configured to operate on the electronic device may display the interfaces. It should be appreciated that the interfaces are merely examples and that alternative or additional content is envisioned.

FIG. 3A illustrates an interface 350 including details relating to modifying operation of a smart item populated within a property, specifically when the property is unoccupied. In particular, the interface 350 may enable a user to modify operation of a thermostat in a property. The interface 350 may indicate that the property is unoccupied and/or that the heat setting is set to 73 degrees (which may be considered too high for an unoccupied property). The interface 350 may enable a user to make various selections corresponding to the heat setting. In particular, the interface 350 may include a default selection 351 that indicates an action to decrease the heat setting to 68 degrees. In some embodiments, the default selection 351 may be determined by the controller of the property. By selecting the default selection 351, the user may cause the electronic device to send a command to the controller to cause the controller to modify the setting of the thermostat to 68 degrees.

The interface 350 may further include a no action selection 353 that, when selected, dismisses the interface 350 or otherwise does not modify any settings associated with the thermostat. Further, the interface 350 may include a "modify setting" 352 that, when selected, may enable the user to input another setting for the thermostat. In particular, if the user selects the modify selection 352, the electronic device may display an interface 360 as illustrated in FIG. 3B. The interface 360 may include a set of selections 361 that enable the user to modify the heat setting (e.g., by increasing or decreasing the heat setting). The interface 360 may further include an "OK" selection 362 that, when selected, causes the electronic device to send a command to the controller to cause the controller to modify the setting of the thermostat to what is indicated in the interface 360. As illustrated in FIG. 3B, if the user selects the "OK" selection 362, the electronic device may send a command to the controller to cause the controller to modify the heat setting of the thermostat to 70 degrees. Further, the interface 360 may include a "CANCEL" selection 363 that, when selected, causes the electronic device to dismiss the interface 360 or proceed to other functionality.

FIG. 3C illustrates an additional interface 365 detailing a confirmation screen for the functionality of FIGS. 3A and 3B. The interface 365 may indicate that the heat setting for the property has been successfully adjusted to 70 degrees, based upon the modification to the heat setting that was input into the interface 360 of FIG. 3B. The interface 365 may further include an "OK" selection 366 that, when selected, causes the electronic device to dismiss the interface 360 or proceed to other functionality.

V. EXEMPLARY USER INTERFACES FOR MANAGING DEVICE OPERATION AND FACILITATING INSURANCE CLAIM PROCESSING

FIGS. 4A-4D illustrate exemplary interfaces associated with example commands and actions for smart devices populated within a property, as well as associated insurance processing for the property. An electronic device (e.g., a mobile device, such as a smartphone) may be configured to display the interfaces and receive selections and inputs via the interfaces. For example, a dedicated application associated with an insurance provider (or with a controller) and that is configured to operate on the electronic device may display the interfaces. It should be appreciated that the interfaces are merely examples and that alternative or additional content is envisioned.

Figure 4A:
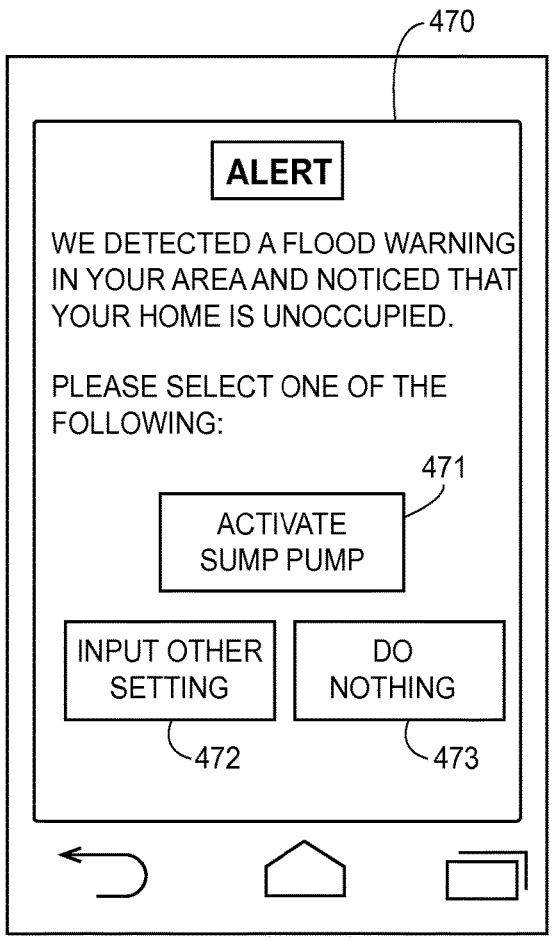
FIGS. 4A-4D depict exemplary interfaces associated with enabling an individual to manage device operation within a property and communicating an associated proposed insurance claim, in accordance with some embodiments.

FIG. 4A illustrates an interface 470 that details an alert detected by a controller within the property. Specifically, the interface 470 may indicate that a flood warning has been detected in the area of the property and that the property is unoccupied. The interface 470 includes a default selection 471 that may indicate an action to activate the sump pump of the property. In embodiments, the default selection 471 may be determined by the controller of the property. For example, the controller may detect the flood warning and/or determine that the sump pump for the property is not activated, and thus determine that the individual may want to activate the sump pump in light of the flood warning. By selecting the default selection 471, the user may cause the electronic device to send a command to the controller to cause the controller to activate the sump pump of the property.

The interface 470 may include a no action selection 473 that, when selected, dismisses the interface 470 and/or otherwise does not take any further action. Further, the interface 470 may include an additional input selection 472 that, when selected, enables the user to select another setting for the controller and/or any smart devices associated therewith. For example, the user may want to shut windows instead of activating the sump pump.

Figure 4B:
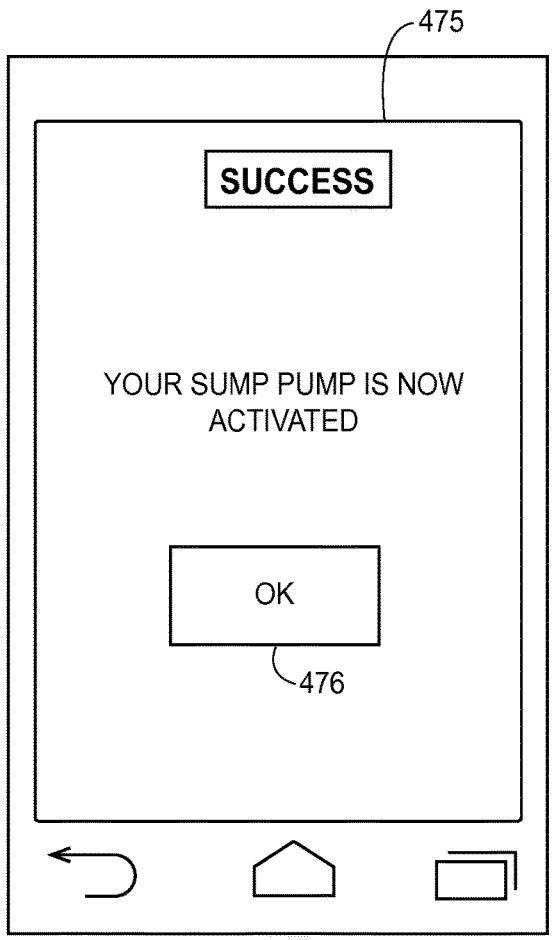

If the user selects the default selection 471, the electronic device may display an interface 475 as illustrated in FIG. 4B, whereby the interface 475 details a confirmation screen for activating the sump pump. The interface 475 may include an "OK" selection 476 that, when selected, causes the electronic device to dismiss the interface 475 and/or proceed to other functionality.

Figure 4C:
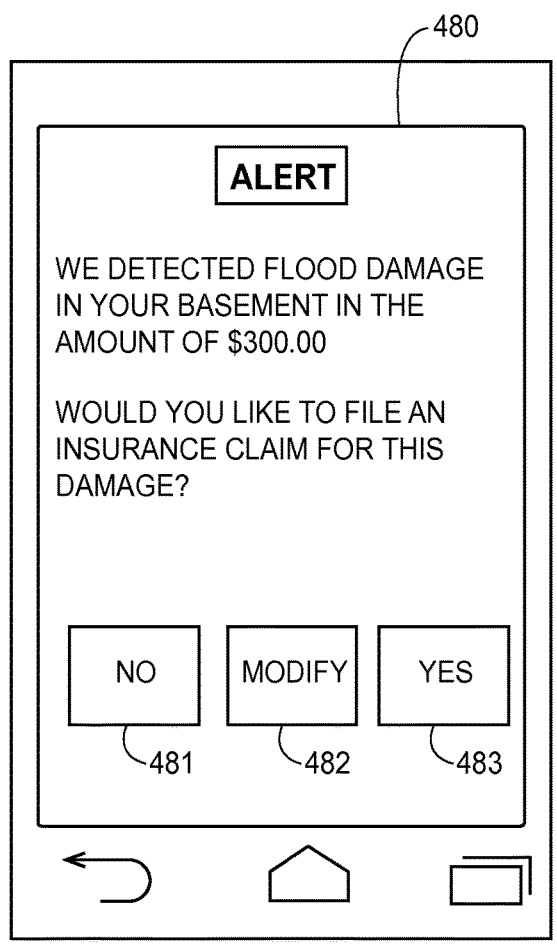

FIG. 4C illustrates another interface 480 associated with a proposed insurance claim that results from damage caused by a resulting flood. In particular, even though the user may have selected to activate the sump pump of the property via the interface of FIG. 4B, a resulting flood may have damaged at least a portion of the property (as well as any smart devices associated with the portion of the property). The controller of the property may also analyze sensor data from the smart devices to estimate an amount of damage to the property.

Figure 4D:
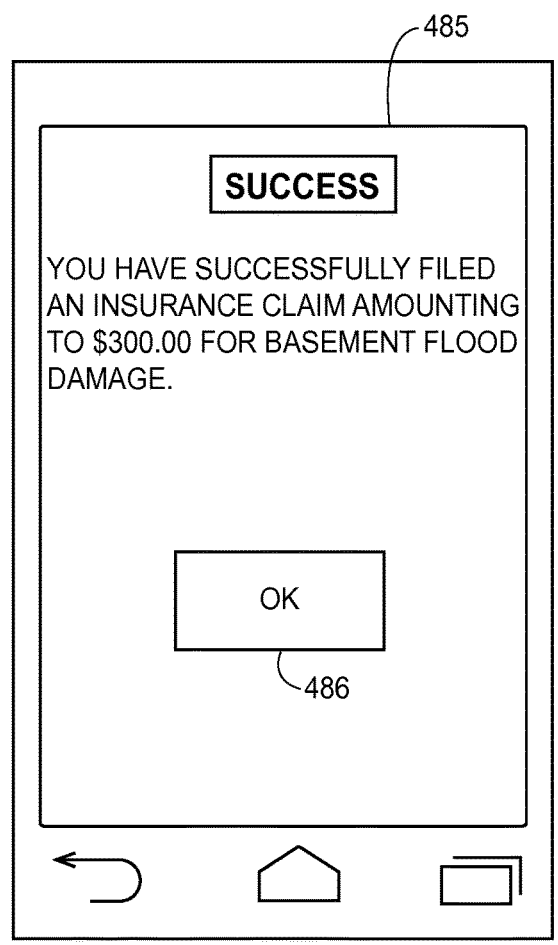

The interface 480 may indicate that flood damage has been detected in the basement of the property, and that the flood damage amounts to a total of $300.00. In some embodiments, the interface 480 may further include additional details related to the damage, such as a listing of devices or items that experienced damage. The interface 480 may enable the user to file an insurance claim for the damage via various selections: a "NO" selection 481, a "MODIFY" selection 482, and a "YES" selection 483. If the user selects the "NO" selection 481, the electronic device may dismiss the interface 480 and/or proceed to other functionality. If the user selects the "MODIFY" selection 482, the electronic device may enable the individual to modify any details, amounts, and/or information associated with the proposed insurance claim. If the user selects the "YES" selection 483, the electronic device may cause an insurance claim to be filed, resulting in the electronic device displaying an interface 485 as illustrated in FIG. 4D. In particular, the interface 485 may indicate that the individual has successfully filed an insurance claim amounting to $300.00 for basement flood damage. The interface 485 may include an "OK" selection 486 that, when selected, may cause the electronic device to dismiss the interface 485 and/or proceed to other functionality.

VI. EXEMPLARY COMMUNICATION FLOW FOR MANAGING DEVICE OPERATION AND FACILITATING INSURANCE CLAIM PROCESSING

Figure 5:
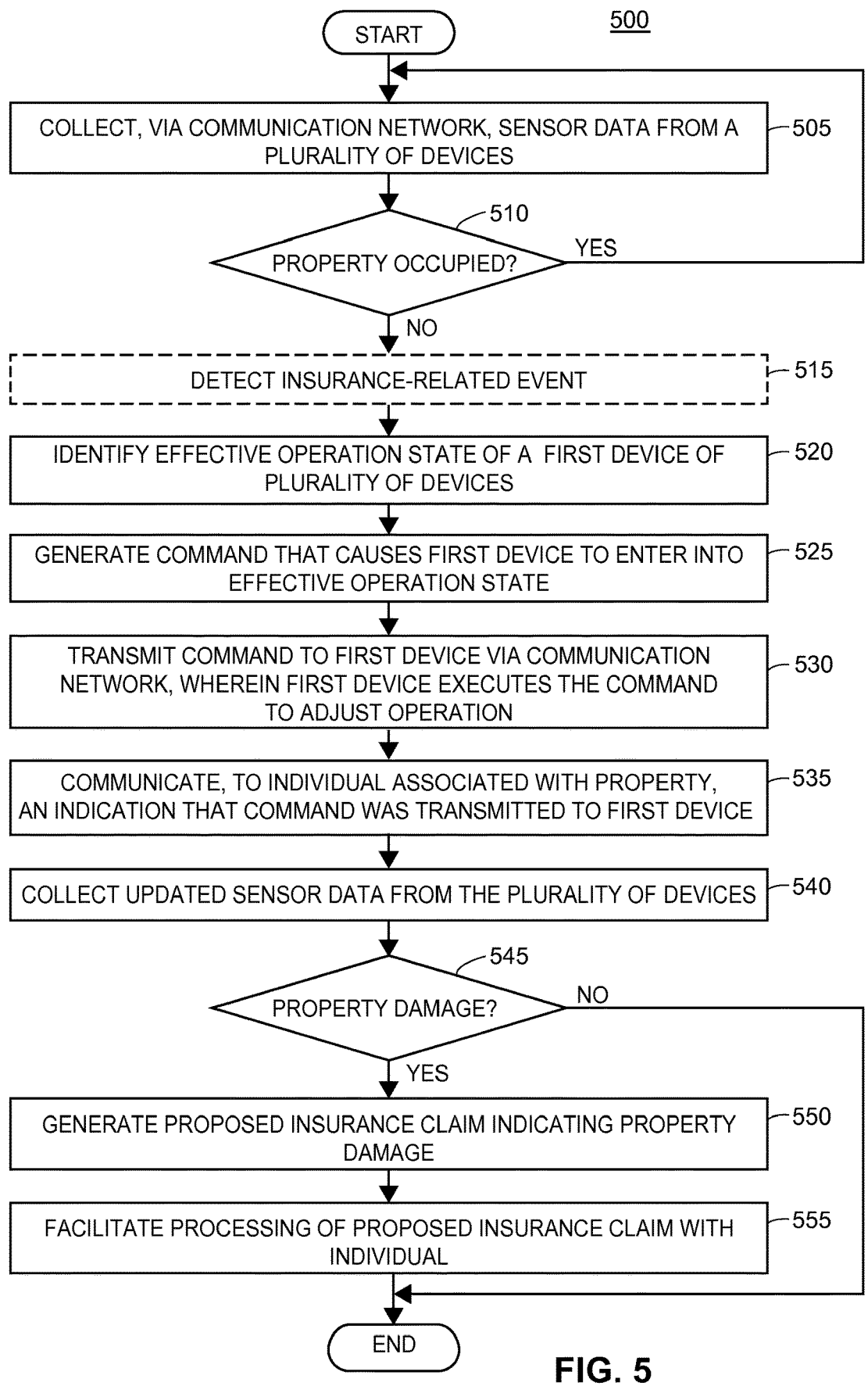
FIG. 5 depicts an exemplary flow diagram associated with managing device operation within a property and facilitating insurance claim processing associated therewith, in accordance with some embodiments.

Referring to FIG. 5, depicted is a block diagram of an exemplary method 500 of interfacing with a plurality of devices populated within a property. The plurality of devices may be in direct or indirect communication with a controller (such as the controller 120 as discussed with respect to FIG. 1 and/or an insurance provider 130 remote processor or server 135). The method 500 may be facilitated by the controller 120 communicating with the insurance provider 130 (and specifically the processing server 135) as well as the customer 140. The customer 140 may access an electronic device (such as the electronic device 145) to view information and make appropriate selections.

The method 500 may begin when the controller collects (block 505), via a communication network, sensor data from the plurality of devices. The communication network may be a wireless or wired LAN, and the controller may collect the sensor data periodically or the plurality of devices may provide the sensor data to the controller automatically. In some embodiments, the collected sensor data may be related to the occupancy state of the property (e.g., motion data, unlock/lock data, etc.). Based upon the collected sensor data, the controller may determine (block 510) whether the property is occupied (e.g., by determining whether motion data has been detected within a certain recent period of time). If the property is occupied ("YES") (i.e., the collected sensor data indicates that at least one individual is located in or around the property), processing may return to 505 and new sensor data may be collected.

If the property is not occupied ("NO") (i.e., the collected sensor data indicates that no individual is located in or around the property), processing may optionally proceed to block 515 at which the controller may detect an insurance-related event. The controller may detect the insurance-related event from various sensor data from the plurality of devices, and/or may detect the insurance-related event from a third-party source or entity.

The controller may identify (block 520) an effective operation state of a first device of the plurality of devices. The effective operation state may or may not be related to the insurance-related event detected in block 515. Generally, the effective operation state may be a condition or state of the property that results in efficient operation of one or more of the plurality of devices. The effective operation state may result in various benefits to the property and/or to an individual associated with the property such as, for example, reduced energy output, increased safety precautions, and/or others. The controller may identify the effective operation state for the first device, where the first device may or may not be associated with the sensor data collected in block 505. In some implementations, the controller may identify multiple devices that may be needed to achieve the effective operation state.

The controller may generate (block 525) a command that causes the first device to enter into the effective operation state. In particular, the command may be executable by the first device. The controller may transmit (block 530) the command to the first device via the communication network, whereby the first device may execute the command to adjust its operation according to the effective operation state. The first device may optionally transmit a confirmation of the operation adjustment to the controller. The controller may communicate (block 535), to an individual associated with the property, an indication that the command was transmitted to the first device. The indication may also enable the individual to explicitly select to transmit another command to the first device or to another device. In some situations, the controller may communicate the indication to the individual prior to transmitting the command to the first device, so that the individual may be able to authorize the controller transmitting the command to the first device. According to some embodiments, the controller may communicate the command to the individual via a communication network separate from (or the same as) the communication network that connects the plurality of devices to the controller.

After the first device executes the command to adjust operation, and/or after the individual has specified an additional or modified command for the first device to execute, the controller may collect (block 540) updated sensor data from the plurality of devices. The controller may collect the updated sensor data periodically or the plurality of devices may provide the updated sensor data to the controller automatically. The controller may determine (block 545), based upon the updated sensor data, whether there is any property damage. The property damage may be in the form of damage to any of the plurality of smart devices or may be damage to any other portions or components of the property.

If the controller determines that there is not damage to the property ("NO"), processing may end or proceed to any other functionality. In contrast, if the controller determines that there is damage to the property ("YES"), the controller may generate (block 550) a proposed insurance claim that indicates the property damage, where the proposed insurance claim is associated with an insurance policy associated with the property. A customer (such as the individual) may have the insurance policy, where the insurance policy insures damage to the plurality of devices and/or specifies a reimbursable amount for the damage. To generate the proposed insurance claim, the controller may estimate a damage amount for any of the damaged devices. The controller may estimate the damage amount based upon various replacement values or costs associated with the devices, and/or based upon the amount of damage indicated in any sensor data. The proposed insurance claim may include the total amount of damage and may further indicate additional fields and information, such as identifications of the customer and the insurance policy, a description of the damage, and/or the like.

The controller may facilitate (block 555) processing of the proposed insurance claim with the individual. In particular, the controller may communicate the proposed insurance claim to the customer, who may accept, reject, and/or modify the proposed insurance claim. If the customer does not accept the proposed insurance claim, processing may end and/or proceed to other functionality. If the customer accepts the proposed insurance claim, the controller may facilitate processing of the proposed insurance claim with the insurance provider.

VII. EXEMPLARY CONTROLLER

Figure 6:
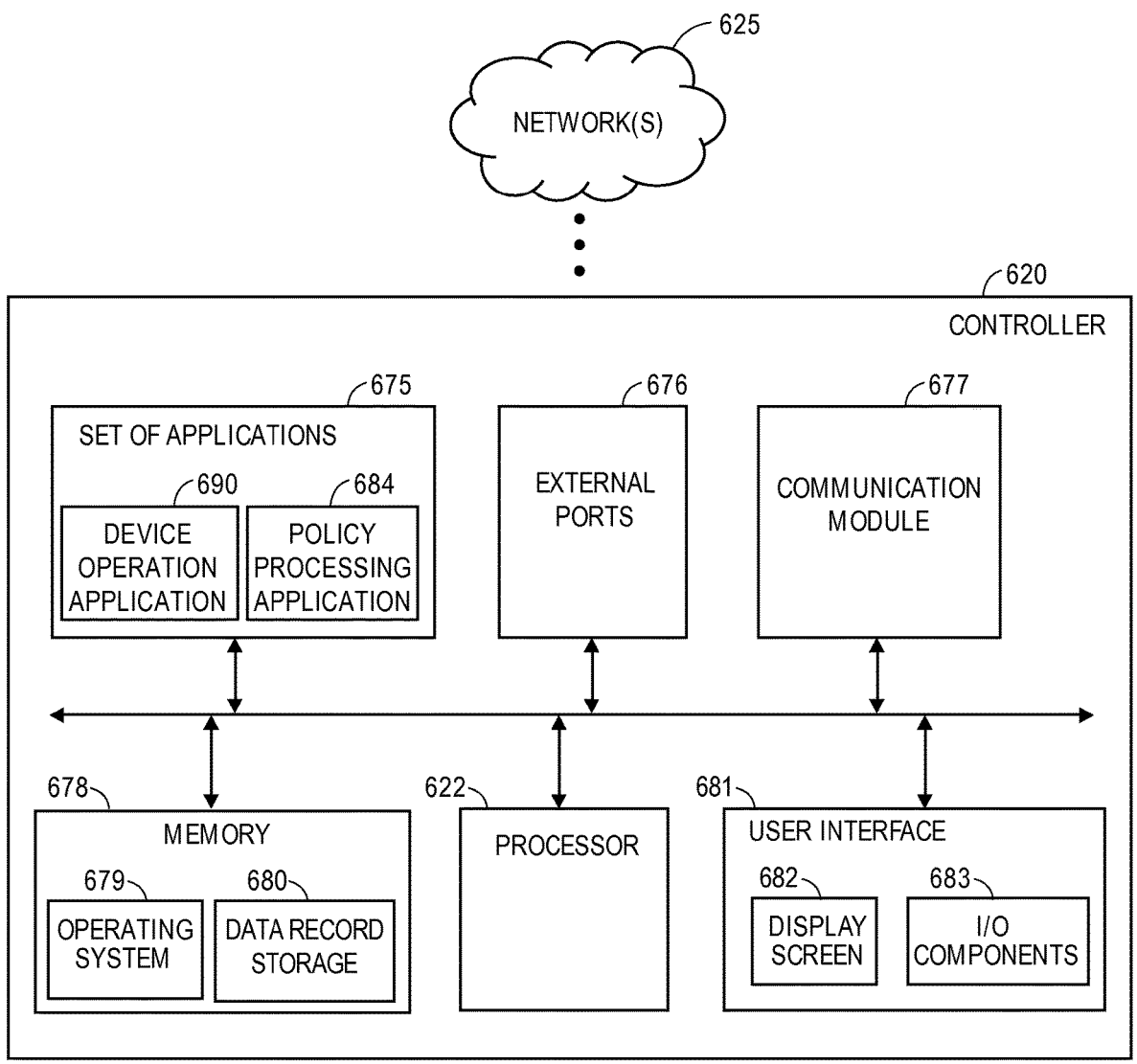
FIG. 6 is a block diagram of an exemplary controller in accordance with some embodiments.

FIG. 6 illustrates a diagram of an exemplary controller 620 (such as the controller 120 discussed with respect to FIG. 1, and/or insurance provider 130 remote processor or server 135) in which the functionalities as discussed herein may be implemented. It should be appreciated that the controller 620 may be associated with a property, as discussed herein.

The controller 620 may include a processor 622 as well as a memory 678. The memory 678 may store an operating system 679 capable of facilitating the functionalities as discussed herein as well as a set of applications 675 (i.e., machine readable instructions). For example, one of the set of applications 675 may be a policy processing application 684 configured to access and process customer insurance policies, and/or another of the set of applications 675 may be a device operation application 690 configured to assess operation states and generate commands to be transmitted to devices. It should be appreciated that other applications are envisioned.

The processor 622 may interface with the memory 678 to execute the operating system 679 and the set of applications 675. According to some embodiments, the memory 678 may also include a data record storage 680 that stores various data and information associated with devices and insurance policies. The policy processing application 684 and the device operation application 690 may interface with the data record storage 680 to retrieve relevant information that the policy processing application 684 and the device operation application 690 may use to manage insurance policies, generate proposed insurance claims, generate executable commands, generate notifications, and/or perform other functionalities. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 620 may further include a communication module 677 configured to communicate data via one or more networks 625. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. Further, the communication module 677 may include a short-range network component (e.g., an RFID reader) configured for short-range network communications. For example, the communication module 677 may receive, via the network 625, sensor data from a plurality of devices populated within a property. The controller 620 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to some embodiments, the user may access the controller 625 via the user interface 681 to process insurance policies and/or perform other functions. The controller 620 may be configured to perform insurance-related functions, such as generating proposed insurance claims and facilitating insurance claim processing. In some embodiments, the controller 620 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 622 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VIII. EXEMPLARY SERVER

Figure 7:
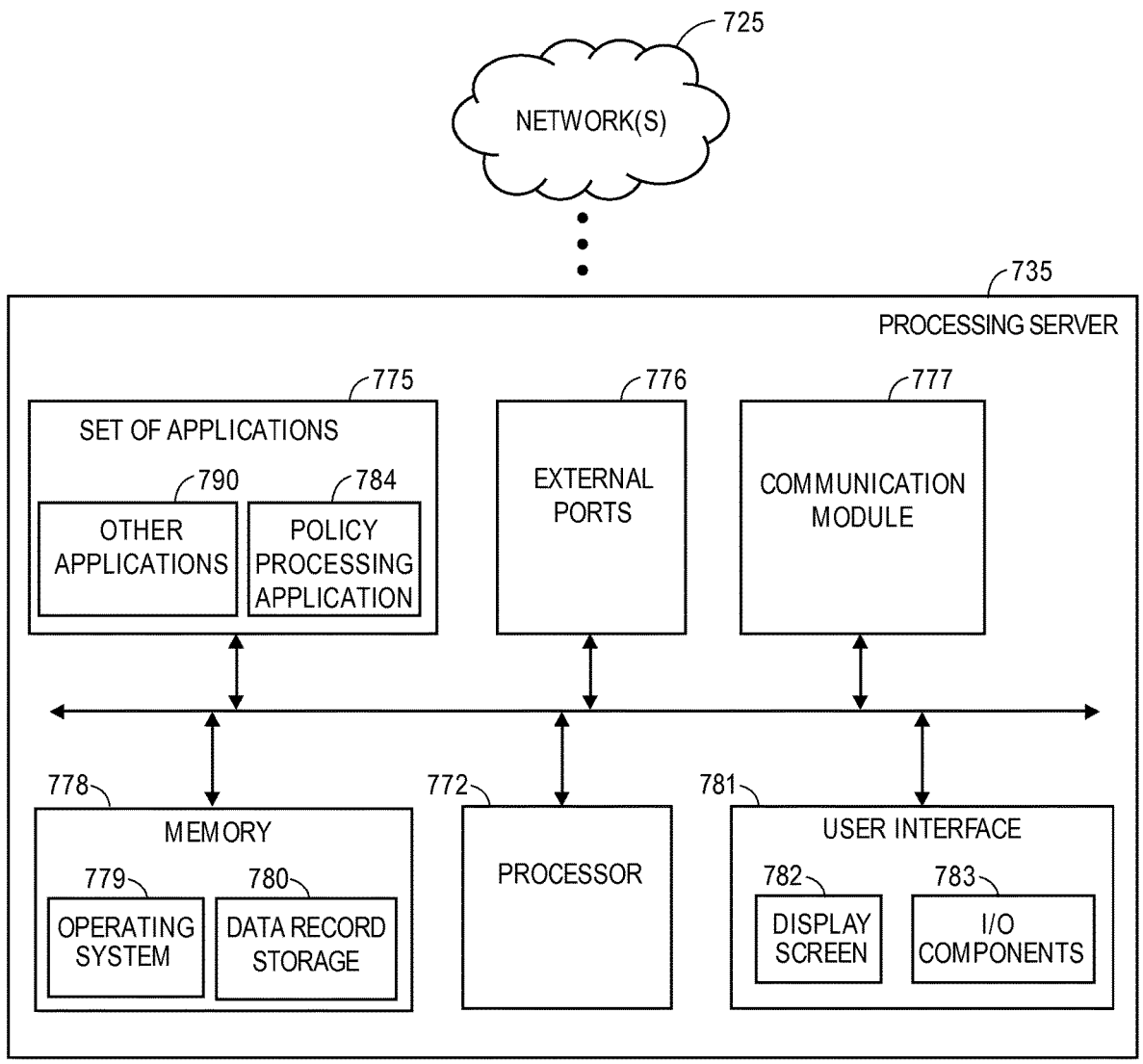
FIG. 7 is a block diagram of an exemplary processing server in accordance with some embodiments.

FIG. 7 illustrates a diagram of an exemplary processing server 735 (such as the processing server 135 discussed with respect to FIG. 1) in which the functionalities as discussed herein may be implemented. It should be appreciated that the processing server 735 may be associated with an insurance provider, as discussed herein.

The processing server 735 may include a processor 722, as well as a memory 778. The memory 778 may store an operating system 779 capable of facilitating the functionalities as discussed herein as well as a set of applications 775 (i.e., machine readable instructions). For example, one of the set of applications 775 may be a policy processing application 784 configured to manage customer insurance policies. It should be appreciated that other applications 790 are envisioned.

The processor 722 may interface with the memory 778 to execute the operating system 779 and the set of applications 775. According to some embodiments, the memory 778 may also include a data record storage 780 that stores various information associated with customer insurance policies. The policy processing application 784 may interface with the data record storage 780 to retrieve relevant information that the policy processing application 784 may use to manage insurance policies, generate notifications, and/or perform other functionalities. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 735 may further include a communication module 777 configured to communicate data via one or more networks 725. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may receive, via the network 725, proposed insurance claims from user devices or hardware components associated with properties. The processing server 725 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs, speakers, microphones). According to some embodiments, the user may access the processing server 735 via the user interface 781 to process insurance policies and/or perform other functions. In some embodiments, the processing server 735 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 722 (e.g., working in connection with the operating system 779) to facilitate the functions as described herein. In this regard, the program code may be implemented in any desired language, and/or may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

IX. PRESENCE AND/OR BEHAVIOR INFORMATION

The present embodiments may relate to the gathering of presence information that may indicate whether or not someone is currently in the home and/or that someone is about to leave the home. The presence information may be remotely gathered via sensors located on devices and may indicate that light switches are turned on and off, refrigerator doors are opened and closed, television or home entertainment system remotes are being operated, appliances are being turned on and off or otherwise operated, clothes or dish washer doors are being opened and shut manually, thermostats are being adjusted manually, security systems are being turned on and off, doors or windows are being opened or closed manually, and/or other manually controlled actions are being performed. The presence information may also be collected from motion sensors, infrared sensors, video cameras, and/or other sensors that detect human presence.

The smart home controller may determine from the presence information the number of hours and/or days a home owner and/or family members are typically home in a given period of time, such as a month or quarter of a year. The amount of time in the home by one or more persons may provide one indication of the amount of risk. An increase in the amount of time a home is occupied may potentially increase risk of personal injury (slips or falls) and/or potentially increase risk associated with equipment failure or operation (e.g., risks of damage caused by oven or stove fires, leaking washers, over flowing tubs, or other sources). On the other hand, an increase in the amount of time a home is occupied may potentially reduce risk associated with break-ins. Collecting presence information over time and comparing the presence information with claim information gathered over a corresponding amount of time, the insurance provider may be able to learn or more accurately assess the impact of presence information on the risk of home damage.

The smart home controller may also gather information, with the home owner's permission, of the home owner's behavior. Insurance premiums and/or risk may be adjusted upward or downward based upon the home owner behavior. Remote sensors and the smart home controller may gather information related to the amount of time that first floor windows are open, garage or other doors are open or unlocked, the amount and type of appliances usually run when the home owner is not at home, other equipment left on or running when the home owner is not monitoring them, such as fire places or running water, and/or other behavioral issues or information that may indicate how responsible a home owner is (which may be a component of the insurance risk), such as how quickly the home owner responds to various alerts or warnings.

The smart home controller and sensors may also gather other information about the home owner. For instance, the sensor data may indicate how often the home owner or family members cook in the home or eat out. Cooking in the home may increase the risk of grease or other types of fires.

X. EXEMPLARY PRESENCE INFORMATION FUNCTIONALITY

Figure 8:
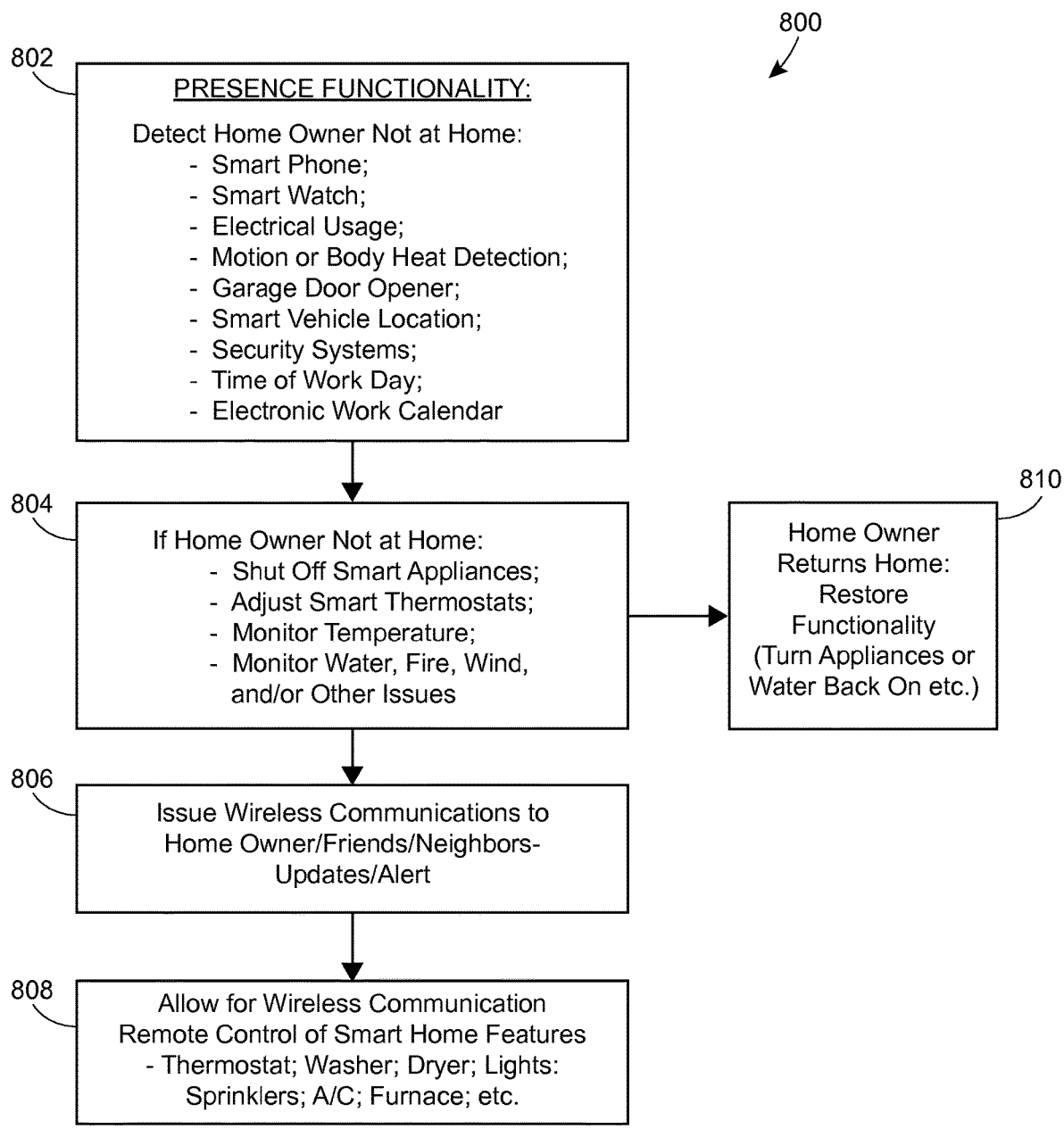
FIG. 8 depicts an exemplary flow diagram associated with utilizing home owner presence information, in accordance with some embodiments.

FIG. 8 depicts an exemplary method of utilizing home owner presence information, such as information indicating or predicting whether or not the home is currently occupied, gathered by a smart home controller (and/or remote processor or server associated with an insurance provider) and/or smart sensors via wireless or wired communication 800. The method 800 may include detecting whether or not the home owner is at home 802; taking actions based upon the home owner's lack of presence 804; issuing wireless communications 806; allowing for remote control of the smart home 808; and/or taking restoration actions based upon the home owner returning home or presence 810. The method may include additional, fewer, or alternate actions.

The method 800 may include detecting whether or not the home owner is at home 802. A smart home controller (and/or remote processor) may gather information from various sensors and/or other sources via wireless or wired communication. The information gathered may indicate whether or not the home owner, family members, or others are present at or within the home.

The information gathered by the smart home controller (and/or remote processor) may be generated and/or transmitted by the home owner's mobile device (e.g., smart phone, smart watch, smart glasses, smart vehicle, home security system, garage door opener, laptop, tablet, phablet, notebook, netbook, smart contact lenses, wearable smart communication devices, or other devices). The information gathered may include the location or GPS position of the home owner.

The information gathered by the smart home controller (and/or remote processor) may be generated by motion sensors, body heat sensors, infrared sensors, time of work day, electronic work calendars, schedule or typical errand information, and/or other sources. Further, the information gathered by the smart home controller (and/or remote processor) may be generated by appliances and utilities (e.g., range, dishwasher, dryer, refrigerator, etc.). The smart home controller (and/or remote processor) may analyze the information to determine presence information. For example, water usage and a refrigerator door opening may each indicate home owner presence. The smart home controller (and/or remote processor) may analyze data from one or more sources and determine whether or not the home owner is home, or if the home is otherwise actually or likely currently occupied.

The method 800 may include taking actions based upon the home owner's (and/or family members) lack of presence 804. The smart home controller (and/or remote processor) may shut off smart appliances; shut on/off water sources; adjust smart thermostats; monitor home temperature; monitor for water, fire, wind, and other issues; and/or perform other actions, including those discussed elsewhere herein, when it is determined that the home is not occupied. For example, if the smart home controller (and/or remote processor) determines a predefined period of lack of human presence, then the smart home controller (and/or remote processor) may shut off certain water sources. Of course, various dependent systems may also be considered, such as a backup water powered sump pump, lawn irrigation system, sprinkler system, hot water heater, and the like, whereby the dependent systems may be controlled separately or differently from the main water sources.

The method 800 may include issuing wireless communications 806. The smart home controller (and/or remote processor) may issue wireless communications to the home owner, family members, neighbors, friends, insurance provider, security provider, and/or others when it is determined that no one is home. The wireless communications may include messages that inform the recipient of the status of the home, i.e., no one currently home, and/or any actions that the smart home controller (and/or remote processor) has (a) directed (e.g., shut off heat or air conditioning, shut off televisions, turned on security system, etc.), and/or (b) recommends taking. The smart home controller (and/or remote processor) may also issue messages that are updates to the current status of home equipment (running, on, operating mode, off, etc.); alerts related to actual or potential insurance-related events detected by the smart home controller (and/or remote processor); and/or warnings or alerts of actual or potential home damage situations.

The method 800 may include allowing for remote control of the smart home 808. The smart home controller (and/or remote processor) may be in wireless communication with the home owner via the home owner's mobile device (e.g., smart phone, smart watch, smart vehicle, tablet, netbook, text messaging or paging device, etc.). The smart home controller (and/or remote processor) may recommend certain adjustments to the operating equipment in the home, or the operation thereof, when no one is determined to be home by the smart home controller (and/or remote processor). As an example, the smart home controller (and/or remote processor) may recommend (a) adjusting the temperature or thermostat to save energy, such as during the work or school day; or (b) turning off operating equipment, such as washers, dryers, lights, sprinklers, air conditioning units, furnaces, and/or other equipment.

If the home owner agrees, sending an acknowledgment message via his or her mobile device may allow the smart home controller (and/or remote processor) to automatically take or direct such actions. Additionally or alternatively, the home owner may be able to control, directly or indirectly via the smart home controller (and/or remote processor), the smart appliances, electronics, and/or other equipment in the home via the home owner's mobile device configured for wireless communication.

The method 800 may include taking restoration actions based upon the home owner returning home 810. The smart home controller (and/or remote processor) may detect that the home owner or family members have returned home, such as by using the same type of information that indicates that no one is home.

When it is determined that someone has returned home, the smart home controller (and/or remote processor) may restore home equipment to the state that the equipment was operating in before being adjusted by the smart home controller (and/or remote processor) when it was determined that no one was home. The smart home controller (and/or remote processor) may turn smart appliances back on, turn water or gas sources back on (e.g., re-pressurize water or gas supply lines), restore the thermostat to the previous temperature, and/or take other actions that restore equipment to previous modes of operation.

XI. EXEMPLARY PRESENCE INFORMATION METHOD

In another aspect, a computer-implemented method of preventing and/or mitigating home damage by dynamically detecting home owner or family presence information may be provided. The method may include (1) detecting whether or not a home owner or family member may be currently at home by collecting sensor information at a smart home controller or insurance provider remote server (via wireless or wired communication between the smart home controller or remote server and one or more sensors); (2) adjusting one or more appliances, electronics, or other smart equipment when the smart home controller or remote server detects that the home is not currently occupied by the home owner or family member (such as by the smart home controller or remote server issuing commands and/or otherwise directing the operation of smart equipment); (3) issuing a wireless communication to the home owner or family member indicating that the home is not currently occupied and/or that the operation of one or more pieces of smart equipment have been adjusted automatically by the smart home controller or remote server; and/or (4) allowing the home owner or family member to remotely control the operation of the one or more pieces of smart equipment via wireless communication from a mobile device (associated with the home owner or family member, respectively) to the smart home controller or insurance provider remote server.

The smart home controller may be in wireless or wired communication with: (a) sensors located about the home and/or on appliances, electronics, fixtures, plumbing, toilets, vehicles, boats, lighting, roofing, walls, wiring, doors, garage door, windows, and/or other components; (b) a mobile device of the home owner or family member, including a smart phone, smart watch, smart glasses, wearable electronic device, RFID (Radio Frequency Identification) tag, laptop, garage door controller, and/or other wireless communication device; (c) a smart vehicle controller or communication system; (d) surge suppressors or other surge protection equipment (e.g., to indicate a lighting strike in the neighborhood); (e) circuit breakers, arc fault circuit interrupters, or other electrical equipment (e.g., to indicate a recurring problem that may raise the risk of an electrical fire); and/or (f) an insurance provider remote server.

The adjusting of one or more appliances, electronics, or other smart equipment when the smart home controller or remote server detects that the home is not currently occupied by the home owner or family member may include the smart home controller issuing commands or otherwise directing, such as via wireless or wired communication, the: (a) shutting off of smart appliances or electronics, including turning off a clothes washer, dryer, dish washer, television, home entertainment system, and/or other equipment; (b) adjusting smart thermostats, including turning down or off either the heat or air conditioner unit to save energy; and/or (c) shutting off one or more sources of water and/or natural gas into the home, including supply valves that feed the home and/or individual appliances with water and/or natural gas, respectively.

The allowing the home owner or family member to remotely control the one or more pieces of smart equipment (via wireless communication from a home owner mobile device to the smart home controller or insurance provider remote server) may include allowing the home owner or family member to remotely control operation of: (a) smart appliances (clothes washer, dryer, dish washer, refrigerator, etc.); (b) smart heating devices (furnace, space heaters, etc.); (c) smart cooling devices (air conditioning units, fans, etc.); (d) smart plumbing fixtures (toilets, showers, water heaters, piping, interior and yard sprinklers, etc.); (e) smart cooking devices (stoves, ovens, grills, microwaves, etc.); (f) smart wiring, lighting, and lamps; (g) smart personal vehicles (automobiles, cycles, bikes, boats, planes, etc.); (h) smart thermostats; (i) smart windows, doors, or garage doors; (j) smart window blinds or shutters; and/or (k) other smart devices and/or sensors capable of wireless or wired communication.

The sensor information may be collected, at least in part, from mobile device sensors and/or vehicle sensors. The sensor information may include home owner current location information, such as GPS (Global Positioning System) coordinate information.

The method may further include (1) collecting, with the home owner's permission, presence information associated with the home owner and/or family members overtime (which may be referred to herein as home owner behavioral information) via the smart home controller or a remote server located at an insurance provider; and/or (2) based upon the presence or behavioral information gathered overtime, conducting insurance-related activity, such as issuing usage-based or behavioral-based home owner insurance. Additionally or alternatively, the insurance-related activity that is performed based upon presence and/or behavior information may include (a) updating an insurance policy or premium; (b) adjusting an insurance discount, rebate, and/or rewards program; (c) handling an insurance claim; (d) providing one or more insurance or equipment recommendations, and/or energy, electricity, gas, or water usage recommendations; and/or (e) other insurance related activity, including that discussed elsewhere herein. The computer-implemented method may include additional, fewer, or alternate actions, including those discussed elsewhere herein.

XII. EXEMPLARY METHOD OF PREVENTION AND MITIGATION

Figure 9:
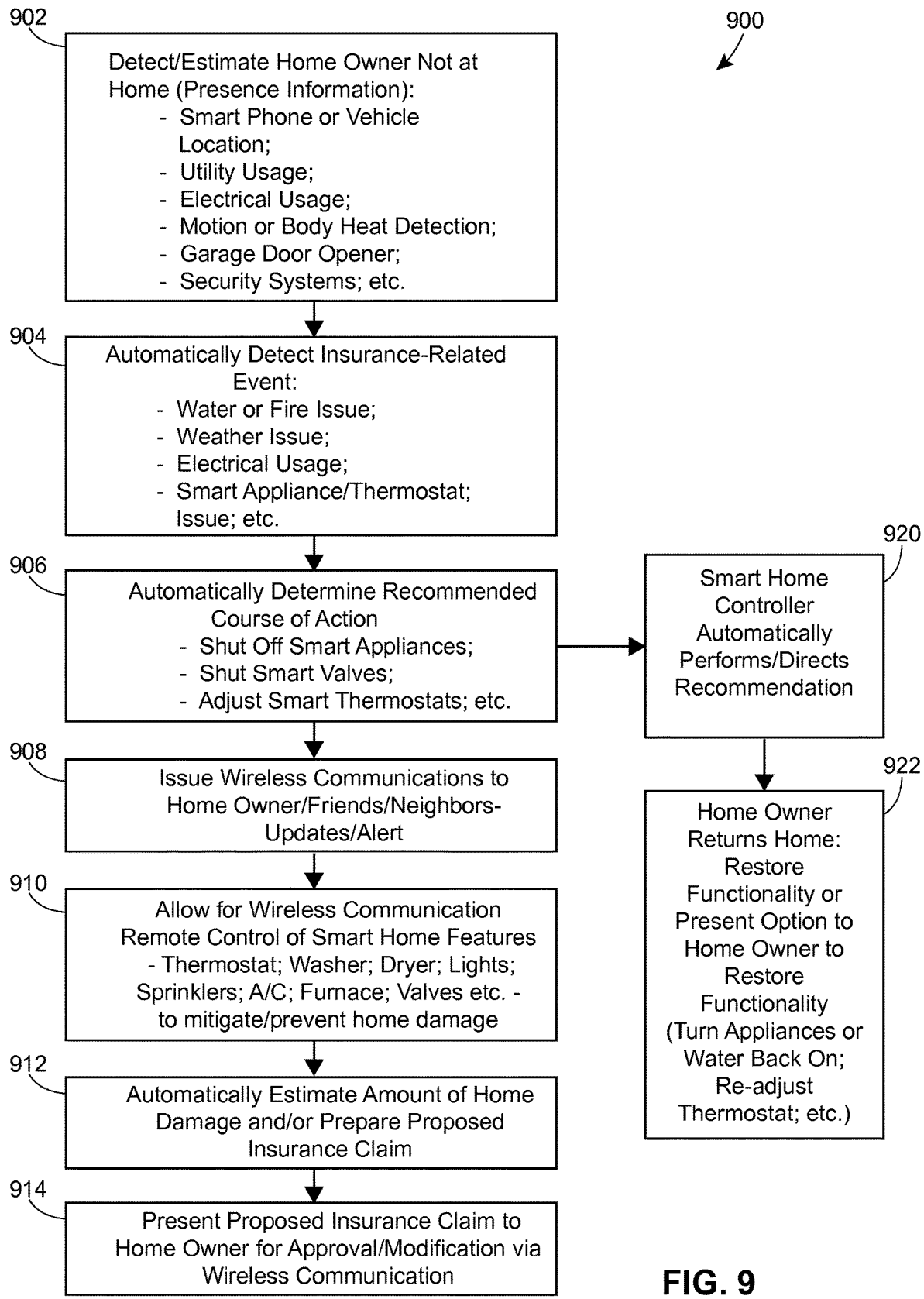
FIG. 9 depicts an exemplary flow associated with using presence information to prevent and/or mitigate damage to the home and/or personal belongings caused by insurance-related events, in accordance with some embodiments.

FIG. 9 depicts an exemplary computer-implemented method of using presence information to prevent and/or mitigate damage to the home and/or personal belongings caused by insurance-related events 900. The method 900 may include automatically detecting and/or estimating that a home owner is not at home 902; automatically detecting an insurance-related event 904; automatically determining a recommended course of action 906; issuing updates or alerts via wireless communications 908; remotely controlling smart home features and/or equipment via wireless communication 910; automatically estimating an amount of home damage and/or preparing a proposed insurance claim 912; presenting the proposed insurance claim to the insured for approval and/or modification via wireless communication 914 (or, in some cases, via a wired communication); and/or remotely receiving the approved and/or modified insurance claim from the insured for automatic or manual processing/handling by the insurance provider. The method 900 may also include the smart home controller automatically performing and/or directing the recommended actions 920; and/or restoring smart home functionality when the home owner returns home 922. The method may include additional, fewer, or alternate actions, including those discussed elsewhere herein.

The method 900 may include automatically detecting and/or estimating (via the local and/or remote processor or server, including a smart home controller and/or insurance provider server) that a home owner is not at home 902. The method 900 may predict and/or detect that a home owner or occupants are not presently at home or have left the home using presence information. Such functionality may be performed by smart home controllers, other processors, and/or remote servers associated with insurance providers, and/or as in manners discussed elsewhere herein.

For instance, presence information and/or determining that a home is currently unoccupied may be determined from location information associated with a smart phone, mobile device, electronic device, beacons, and/or smart vehicle. The home owner's and/or other home occupants' electronic devices (smart phone or smart vehicle) may be each be equipped with a GPS (Global Positioning System) unit and a transmitter. The GPS unit may determine the location of an electronic device by current latitude and longitude coordinates of the electronic device, and the transmitter may transmit that location to a smart home controller and/or a remote server associated with an insurance provider. In some implementations, beacons that are disposed within a home (e.g., as part of a light switch) may gather presence data and wirelessly transmit the presence data to an electronic device, where it may be available for further analysis.

Presence information may also be determined and/or predicted from utility, electricity, gas, and/or water usage, such as by monitoring utility meters, flow meters, usage meters, or thermostats. Additionally or alternatively, presence information may be determined and/or predicted from motion sensors, infrared sensors, and/or body heat detectors/sensors.

Presence information may also be determined and/or predicted from smart garage door openers, smart garage doors, smart front doors, and/or other sensors that indicate that doors have been opened and/or shut that are usually operated when occupants of the home leave or enter. Such information may be combined with time of day information (such as early in the morning) to predict that one or more of the occupants (of the home, apartment, dorm, condo, dwelling, building, etc.) have left for school, work, or other reasons.

Presence information may be determined from security systems. For instance, remotely detecting that the security system has been activated may indicate that the home (or apartment or other dwelling) is unoccupied, especially if activated during daylight hours. In general, presence information indicating that the home (or apartment or other dwelling) is unoccupied, or only occupied by children, may indicate that the insured's home and personal belongings are at greater risk if there is an insurance-related event, such as a pipe breaking, water leak, appliance issue (washers or baths overflowing), fire, security threat, etc.

The method 900 may include automatically detecting (via the local and/or remote processor or server) an insurance-related event 904. Detecting and/or predicting an insurance-related event may be performed by a smart home controller, other processor, and/or remote server associated with an insurance provider, such as in the manners discussed elsewhere herein. For instance, a processor or smart home controller may collect via wireless communication information from various sensors dispersed about a home. The data collected may relate to various alarms, and/or may indicate a water-related or fire-related issue, a weather-related issue, a smart appliance or smart thermostat issue, etc. As examples, a smart home controller may receive data indicating (1) a water or gas pipe is leaking, (2) a smart appliance is operating abnormally, (3) unexpected water is being detecting in a bathroom, washroom, or kitchen (indicating the possibility of an overflowing toilet, and/or overflowing clothes or dish washing machine), and/or (4) other abnormal conditions, including those discussed elsewhere herein.

The method 900 may include automatically determining (via the local and/or remote processor or server) a recommended course of action 906. A smart home controller, other processor, and/or remote server associated with an insurance provider may automatically analyze the insurance-related event and determine a corrective or mitigating course of action. For instance, a table or other data structure of remedial actions may be stored in a memory. When the smart home controller receives information indicating one or more abnormal conditions, the smart home controller may use the abnormal condition(s) as a look-up index and retrieve a recommended course from the data structure.

The recommended courses of action may include (a) shutting certain valves, such as water or gas valves; (b) shutting off smart appliances; (c) adjusting smart appliances; and/or taking other actions. The recommended courses of action may additionally or alternatively include those discussed elsewhere herein.

The method 900 may include issuing updates, alerts, and/or recommended courses of action (as determined by, or under the control of, the local and/or remote processor or server) via wireless communications 908, including those discussed elsewhere herein. For instance, messages may be wirelessly communicated to home owners; renters; their family members, friends, neighbors, and/or the insurance provider; and/or third parties, such as repair men, the local police, fire department, hospital, and/or first responders. The messages may originate from a smart home controller, a remote server associated with an insurance provider, and/or other entity.

The method 900 may include remotely controlling smart home features or equipment via wireless communication 910. For instance, remote control of various smart home features may be performed via the manners discussed elsewhere herein. For instance, a home owner may be able to wirelessly direct (via their mobile device) a smart home controller to adjust and/or operate a smart thermostat, smart washer or dryer, smart lights, smart sprinklers, smart air conditioning units, smart furnaces or heaters, smart valves, etc. Alternatively, a remote server associated with the insurance provider may direct and/or control such functionality. Such remote control of smart home equipment may prevent insurance-related events and/or alleviate or mitigate damage to the home or personal belongings caused by an insurance-related event.

The method 900 may include, via a smart home controller, and/or a processor or remote server associated with the insurance provider, automatically estimating an amount of home damage and/or preparing an associated or related proposed insurance claim 912. The method 900 may include estimating an amount of home damage in the manner discussed elsewhere herein.

For instance, a smart home controller and/or remote server associated with an insurance provider may collect data from sensors or equipment (e.g., cameras) located about a home. That data may be taken or captured before, during, and/or after an insurance-related event to build a sequence of events that caused the damage, as well as facilitate estimating accurate worth of personal belongings and the home before and after the insurance-related event. This in turn, may facilitate estimating an accurate amount of loss or damage caused by the insurance-related event.

The method 900 may include controlling and/or directing the presentation of, otherwise presenting, via a processor or remote server associated with the insurance provider, the proposed insurance claim to the insured for approval and/or modification via wireless communication 914. For instance, as discussed elsewhere herein, a proposed insurance claim may be wirelessly communicated to the insured via their mobile device, smart phone, and/or other electronic device configured for wireless communication.

The method 900 may include, via the smart home controller, other processor, or a remote server associated with the insurance provider, automatically performing and/or directing the recommended actions 920. For instance, after a recommended course of action is determined 906, the smart home controller, other processor, and/or a remote server associated with the insurance provider, may automatically take and/or direct remedial actions, via wired or wireless communication. Such remedial actions may include automatically shutting water, gas, or other valves; operating smart equipment or appliances; and/or directing other actions for smart equipment, including actions discussed elsewhere herein.

The method 900 may include restoring smart home (or smart equipment) functionality when it detected that the home owner and/or family members have returned home 922. Such functionality may be restored via wired or wireless communication, including communication originating from a smart home controller, other processor, and/or a remote server associated with the insurance provider.

As examples, smart appliances may be turned back on and/or restored to their previous states; water, gas, or other valves may be restored to their original states; and/or smart thermostats may be restored to their original states (such as restore heat and/or air conditioning to the level set at prior to the home owner or occupants leaving the house). Additional, less, or alternate functionality may be re-adjusted or restored, including that discussed elsewhere herein.

In another aspect, a computer-implemented method of mitigating damage caused by an insurance-related event may be provided. The method may include: (1) detecting and/or estimating that a home or residence is presently unoccupied by the owner or occupants (via a local or remote processor or server, such as a smart home controller, and/or a remote processor or server associated with an insurance provider), such as by using location information associated with the owner or occupants' mobile devices or smart vehicles, utility usage of the home or residence, motion or body heat detection, smart garage or other door, security system activation, etc.; (2) automatically detecting (via the local or remote processor or server) an insurance-related event (e.g., water or fire issue, weather issue, issue with a smart appliance or thermostat, etc.) is about to happen, is happening, or has happened within, or in the vicinity of, the home or residence; (3) automatically determining (via the local or remote processor or server) a recommended course of action (e.g., shutting off smart appliances, shutting smart water, gas, or other values, adjusting smart thermostats, etc.) to prevent or mitigate the damage to the home or residence, and/or personal belongings therein, caused by the insurance-related event, the recommended course of action involving controlling smart home features and/or equipment; (4) issuing updates or alerts that include the recommended course of action to the home or residence owner or occupants (under the direction and/or control of the local or remote processor or server) via wireless communication; and/or (5) remotely controlling smart home features and/or equipment that carry out the recommended course action and/or prevent and/or mitigate the damage caused by the insurance-related event, wherein the smart home features may be remotely controlled via (a) a mobile device associated with the home or residence owner or occupant, (b) a smart home controller, and/or (c) a remote processor or server associated with an insurance provider (or other third party).

The method may further include: (6) automatically estimating (via the local or remote processor or server) an amount of home damage caused by the insurance-related event; (7) automatically preparing (via the local or remote processor or server) a proposed insurance claim for the home or residence owner or occupant; (8) directing and/or controlling (via the local or remote processor or server) a presentation of the proposed insurance claim to the home or residence owner or occupant for review, approval, and/or modification; and/or (9) receiving and/or accepting (via the local or remote processor or server) an approved or modified insurance claim from the home or residence owner or occupant via wireless communication sent from a mobile device associated with the home or residence owner or occupant to facilitate processing and/or handling of the insurance claim by the insurance provider that provides insurance coverage for the home or residence and/or personal belongings therein.

The method may also include detecting the home or residence owner or occupant has returned home (via the local or remote processor or server), such as by monitoring mobile device or smart vehicle GPS location, smart garage or front door operation, data from beacons disposed within the property, utility usage, light operation, motion sensors, security system operation, etc.; and/or then restoring smart home feature and equipment operation to that which was operating at the time the home or residence became unoccupied (via the local or remote processor or server), such as turning smart appliances, smart televisions, or smart lights back on; turning sources of water, gas, or electricity back on; re-adjusting smart thermostats, etc.

XIII. EXEMPLARY METHOD OF INTERFACING WITH DEVICES

In one aspect, a computer-implemented method of interfacing with a plurality of devices populated within a property may be provided. The plurality of devices may be configured to monitor conditions associated with the property. The method may include (1) collecting, at or by (i) a hardware controller located at the property, and/or (ii) a remote processor associated with an insurance property via wired or wireless communication and/or a communication network, sensor data from the plurality of devices; (2) determining, at or via the hardware controller and/or remote processor from the sensor data, that the property is unoccupied; (3) generating, at or via the hardware controller and/or remote processor, a command to issue to a first device of the plurality of devices based upon the determination that the property is unoccupied; (4) transmitting, from the hardware controller and/or remote processor, the command to the first device via wired or wireless communication and/or the communication network, wherein the first device executes the command to adjust operation of the first device; and/or (5) communicating to an individual associated with the property, or transmitting, from the hardware controller and/or remote processor, to a mobile device or other communications device of the individual associated with the property an indication that the command was transmitted to the first device, and/or that the first device adjusted its operation or performed an action associated with the command. The method may include additional, less, or alternate actions, including those discussed elsewhere herein.

For instance, the computer-implemented method may further include receiving, at the hardware controller and/or remote processor, via the mobile device of the individual, an additional command to issue to the first device; and transmitting, from the hardware controller and/or remote processor, the additional command to the first device via wired or wireless communication and/or the communication network, wherein the first device executes the additional command to adjust operation of the first device.

The computer-implemented method may further include determining, at or via the hardware controller and/or remote processor, that an insurance-related event associated with the property is imminent or has occurred; wherein generating the command comprises: determining, based upon the insurance-related event, an action to prevent or mitigate damage to the property at or via the hardware controller and/or remote processor, and/or generating the command based upon the action to prevent or mitigate damage to the property at or via the hardware controller and/or remote processor.

The computer-implemented method may further include communicating, to the individual associated with the property, a notification that the insurance-related event is imminent or has occurred. The computer-implemented method may further include communicating or transmitting to the mobile device of the individual associated with the property, an indication of the command; and receiving from the mobile device of the individual, at or via the hardware controller and/or remote processor, an instruction to transmit the command to the first device.

The computer-implemented method may further include collecting, via wired or wireless communication and/or the communication network, updated sensor data from the plurality of devices; determining, at or via the hardware controller and/or remote processor, based upon the updated sensor data, that damage has occurred to the property; and/or generating, at or via the hardware controller and/or remote processor, a proposed insurance claim indicating the damage that has occurred to the property.

The computer-implemented method may further include communicating or transmitting the proposed insurance claim to the mobile device of the individual associated with the property; and/or receiving from the mobile device of the individual, at or via the hardware controller and/or remote processor, an acceptance of the proposed insurance claim.

The computer-implemented method may further include communicating the indication to the individual via an additional communication network. The computer-implemented method may further include determining, at or via the hardware controller and/or remote processor, an operation state of the first device that is effective when the property is unoccupied; and generating, at or via the hardware controller and/or remote processor, the command that causes the first device to enter into the operation state.

The computer-implemented method may further include (a) collecting, at or by the hardware controller and/or remote processor via wired or wireless communication and/or the communication network, updated sensor data from the plurality of devices; (b) determining from the updated sensor data, at or via the hardware controller and/or remote processor, that the property is occupied; (c) generating, at or via the hardware controller and/or remote processor, an additional command to issue to the first device based upon the determination that the property is occupied; and/or (d) transmitting, from the hardware controller and/or remote processor, the additional command to the first device via wired or wireless communication and/or the communication network, wherein the first device executes the additional command to adjust operation of the first device to facilitate prevention or mitigation of risk or damage to the property.

XIV. EXEMPLARY SYSTEM OF INTERFACING WITH DEVICES

A system for interfacing with a plurality of devices populated within a property and configured to monitor conditions associated with the property may be provided. The system may include a memory adapted to store non-transitory computer executable instructions; a communication module adapted to communicate data; and a hardware controller including a processor and adapted to interface with the communication module. The processor may be configured to execute the non-transitory computer executable instructions to cause the processor to: (1) collect, via the communication module, sensor data from the plurality of devices; (2) determine, from the sensor data, that the property is unoccupied; (3) generate a command to issue to a first device of the plurality of devices based upon the determination that the property is unoccupied; (4) transmit the command to the first device via the communication module, wherein the first device executes the command to adjust operation of the first device; and/or (4) communicate, to an individual associated with the property via the communication module, an indication that the command was transmitted to the first device. The processor may be configured with additional, less, or alternate functionality, including that discussed elsewhere herein.

In one aspect, the processor may be configured to: receive, from the individual via the communication module, an additional command to issue to the first device, and/or transmit the additional command to the first device via the communication module, wherein the first device executes the additional command to adjust operation of the first device.

The processor may further be configured to: determine that an insurance-related event associated with the property is imminent or has occurred, wherein to generate the command, and/or determine, based upon the insurance-related event, an action to prevent or mitigate damage to the property, and generate the command based upon the action to prevent or mitigate damage to the property.

The processor may be configured to communicate, to the individual associated with the property via the communication module, a notification that the insurance-related event is imminent or has occurred. The processor may also be configured to communicate, to the individual associated with the property via the communication module, an indication of the command, and/or receive, from the individual, an instruction to transmit the command to the first device.

In one aspect, the processor may further be configured to (i) collect, via the communication module, updated sensor data from the plurality of devices; (ii) determine, based upon the updated sensor data, that damage has occurred to the property; (iii) generate a proposed insurance claim indicating the damage that has occurred to the property; (iv) communicate the proposed insurance claim to the individual associated with the property; and/or (v) receive, from the individual, an acceptance of the proposed insurance claim.

XV. EXEMPLARY METHOD OF PREVENTING AND/OR MITIGATING HOME DAMAGE

A computer-implemented method of preventing and/or mitigating home damage by dynamically detecting presence information may be provided. The method may include (1) detecting whether or not a home owner or family member is currently at home by collecting sensor information at a smart home controller via wireless or wired communication between the smart home controller with one or more sensors; (2) adjusting one or more appliances, electronics, or pieces of smart equipment when the smart home controller detects that the home is not currently occupied by the home owner or family member, such as by the smart home controller issuing commands and/or otherwise directing the operation of the smart equipment; (3) issuing a wireless communication to the home owner or family member indicating that the home is not currently occupied and/or that operation of one or more pieces of smart equipment have been adjusted automatically by the smart home controller; and/or (4) allowing the home owner or family member to remotely control the one or more pieces of smart equipment via a wireless communication transmitted from a mobile device to the smart home controller. The method may include additional, less, or alternate actions, including those discussed elsewhere herein.

For instance, the smart home controller may be in wireless or wired communication with: (a) sensors located about the home and/or on appliances, electronics, fixtures, plumbing, toilets, vehicles, boats, lighting, roofing, walls, wiring, doors, windows, garage doors, and/or other components; (b) a mobile device of the home owner or family member, including a smart phone, smart watch, smart glasses, laptop, tablet, wearable electronics device, garage door controller, and/or other wireless communication device; (c) a smart vehicle controller or communication system; and/or (d) an insurance provider remote server.

In one aspect, when the smart home controller detects that the home is not currently occupied by the home owner or family member, the smart home controller may issue commands or otherwise direct, such as via wireless or wired communication, (a) shutting off of smart appliances or electronics, including turning off a clothes washer, dryer, dish washer, television, home entertainment system, or other smart equipment; (b) adjusting smart thermostats, including turning down either the heat or air conditioning to save energy; or (c) shutting off one or more sources of water into the home, including supply valves that feed the home and/or individual appliances with water.

In another aspect, the computer-implemented method may allow the home owner or family member to remotely control operation of: (a) a smart appliance, including a clothes washer, dryer, dish washer, or refrigerator; (b) a smart heating device, including a furnace, space heaters, or other heater; (c) a smart cooling device, including an air conditioning unit, fan, and/or ceiling fan; (d) a smart plumbing fixture, including a toilet, shower, water heater, piping, and/or interior and yard sprinkler; (e) a smart cooking device, including a stove, oven, grill, microwave, fryer, toaster, pan, frying pan, griddle, skillet, or other cooking device; (f) smart wiring or lighting; (g) a smart thermostat; (i) a smart window, door, or garage door; (j) smart window blinds or shutters; and/or (k) another smart device and/or sensor capable of wireless or wired communication.

XVI. ADDITIONAL CONSIDERATIONS

As used herein, the term "smart" may refer to devices, sensors, or appliances located within or proximate to a property, and with the ability to communicate information about the status of the device, sensor, or appliance and/or receive instructions that control the operation of the device, sensor, or appliance, such as via wired or wireless communication or data transmissions. For example, a smart thermostat may be able to remotely communicate the current temperature of the home and receive instructions to adjust the temperature to a new level. As another example, a smart water tank may be able to remotely communicate the water level contained therein and receive instructions to restrict the flow of water leaving the tank. In contrast, "dumb" devices, sensors, or appliances located within or proximate to a property may require manual control. Referring again to the thermostat example, to adjust the temperature on a "dumb" thermostat, a person may have to manually interact with the thermostat. As such, a person may be unable to use a communication network to remotely adjust a "dumb" device, sensor, or appliance.

A "smart device" as used herein may refer to any of a smart device, sensor, appliance, and/or other smart equipment that may be located (or disposed) within or proximate to a property. In some embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual may be a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as homes, offices, farms, lots, parks, apartments, condos, and/or other types of properties or buildings. Accordingly, "homeowner" may be used interchangeably with "property owner."

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies may also be envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of interfacing with a plurality of devices populated within a property, the plurality of devices configured to monitor conditions associated with the property, the method comprising:
   collecting, at or by (i) a hardware controller located at the property, and/or (ii) a remote processor associated with a property via wired or wireless communication and/or a communication network, sensor data from the plurality of devices;
   determining, at or via the hardware controller and/or remote processor from the sensor data, that the property is unoccupied;
   when the property is determined to be unoccupied, determining, at or via the hardware controller and/or remote processor from the sensor data, that an unexpected water event is happening, the unexpected water event including at least one of: (1) a water or gas pipe is leaking, (2) a smart appliance is operating abnormally, or (3) unexpected water is detected within the property when the property is unoccupied;
   when the property is unoccupied and the unexpected water event is happening, automatically determining, at or via the hardware controller and/or remote processor, a recommended course of action, wherein the recommended course of action includes shutting off a smart clothes dryer; and
   directing, at or via the hardware controller and/or remote processor, the smart clothes dryer to shut off via wireless communication to facilitate mitigating water damage to the property.

2. The computer-implemented method of claim 1, further comprising:
   prior to directing the recommended course of action to be carried out, transmitting, at or via the hardware controller and/or remote processor, the recommended course of action to an individual's mobile device for display on the mobile device.

3. The computer-implemented method of claim 2, further comprising:
   receiving, at the hardware controller and/or remote processor, via the mobile device of the individual, approval for the recommended course of action to be carried out, and then directing the recommended course of action be carried out via the hardware controller and/or remote processor.

4. The computer-implemented method of claim 1, wherein
   determining, at or via the hardware controller and/or remote processor from the sensor data, that the property is unoccupied is determined from water usage.

5. The computer-implemented method of claim 1, wherein determining, at or via the hardware controller and/or remote processor from the sensor data, that the property is unoccupied is determined from infrared sensors or body heat sensors.

6. The computer-implemented method of claim 1, further comprising:
   collecting, via wired or wireless communication and/or the communication network, updated sensor data from the plurality of devices; and
   determining, at or via the hardware controller and/or remote processor, based upon the updated sensor data, that water damage has occurred to the property.

7. The computer-implemented method of claim 6, further comprising:
   estimating, at or via the hardware controller and/or remote processor, based upon the updated sensor data, an amount of water damage to the property.

8. The computer-implemented method of claim 1, the method further comprising allowing an individual to remotely control via their mobile device a smart dish washer or a smart clothes washer.

9. A computer system configured to interface with a plurality of devices populated within a property, the plurality of devices configured to monitor conditions associated with the property, the system comprising one or more processors configured to:
   collect, via wired or wireless communication and/or a communication network, sensor data from the plurality of devices;
   determine from the sensor data, that the property is unoccupied;
   when the property is determined to be unoccupied, determine from the sensor data, that an unexpected water event is happening, the unexpected water event including at least one of: (1) a water or gas pipe is leaking, (2) a smart appliance is operating abnormally, or (3) unexpected water is detected within the property when the property is unoccupied;
   when the property is unoccupied and the unexpected water event is happening, automatically determine a recommended course of action, wherein the recommended course of action includes shutting off a smart clothes dryer; and
   direct the smart clothes dryer to shut off via wireless communication to facilitate mitigating water damage to the property.

10. The computer system of claim 9, the one or more processors further configured to:

prior to directing the recommended course of action to be carried out, transmit the recommended course of action to an individual's mobile device for display on the mobile device.

11. The computer system of claim 9, wherein the one or more processors further configured to:
receive, via the mobile device of the individual, approval for the recommended course of action to be carried out, and then direct the recommended course of action be carried out via the hardware controller and/or remote processor.

12. The computer system of claim 9, wherein the one or more processors determine that the property is unoccupied from water usage.

13. The computer system of claim 9, wherein the one or more processors determine that the property is unoccupied from infrared sensors or body heat sensors.

\* \* \* \* \*